United States Patent
Yoo et al.

(10) Patent No.: US 9,984,651 B2
(45) Date of Patent: May 29, 2018

(54) METHOD AND APPARATUS FOR DISPLAYING COMPOSITION SCREEN IMAGE BY COMPOSING SCREEN IMAGES OF OPERATING SYSTEMS (OSS)

(71) Applicant: SAMSUNG ELECTRONICS CO., LTD., Suwon-si (KR)

(72) Inventors: Jae-Yong Yoo, Gwangju (KR); Min Kang, Seongnam-si (KR); Byung-chul So, Seoul (KR); Sung-min Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

(21) Appl. No.: 14/813,262

(22) Filed: Jul. 30, 2015

(65) Prior Publication Data

US 2016/0232872 A1    Aug. 11, 2016

Related U.S. Application Data

(60) Provisional application No. 62/113,032, filed on Feb. 6, 2015.

(30) Foreign Application Priority Data

Feb. 6, 2015    (KR) .................. 10-2015-0018874

(51) Int. Cl.
*G09G 5/00*        (2006.01)
*G09G 5/377*       (2006.01)
*G06F 9/44*        (2018.01)
*G06F 9/455*       (2018.01)

(52) U.S. Cl.
CPC .......... *G09G 5/005* (2013.01); *G06F 9/4445* (2013.01); *G06F 9/452* (2018.02); *G06F 9/45558* (2013.01); *G09G 5/377* (2013.01); *G06F 2009/45579* (2013.01); *G09G 2340/12* (2013.01); *G09G 2360/02* (2013.01); *G09G 2360/12* (2013.01)

(58) Field of Classification Search
CPC .... G09G 5/005; G09G 5/377; G09G 2340/12; G09G 2360/02; G09G 2360/12; G06F 9/4445; G06F 9/45558; G06F 2009/45579; G06F 9/452
See application file for complete search history.

(56) References Cited

U.S. PATENT DOCUMENTS 7,996,785 B2      8/2011 Neil
2006/0005187 A1*  1/2006 Neil .................. G06F 9/455
                                                          718/1
2009/0006978 A1*  1/2009 Swift ................. G09G 5/005
                                                          715/748
(Continued)

*Primary Examiner* — Jwalant Amin
(74) *Attorney, Agent, or Firm* — Sughrue Mion, PLLC

(57) ABSTRACT

A method of composing and displaying screen images includes transmitting a screen image of a guest operating system (OS) to a host OS, in response to the guest OS and the host OS exclusively or jointly accessing a graphics processing unit (GPU) in a pass-through or mediated pass-through environment via GPU virtualization; generating a composition screen image by transforming the screen image of the guest OS into a texture and composing the texture with a texture screen image of the host OS; and displaying the composition screen image.

18 Claims, 28 Drawing Sheets

(56) References Cited

U.S. PATENT DOCUMENTS

| | | | |
|---|---|---|---|
| 2011/0191550 A1* | 8/2011 | Lee | G06F 12/00 |
| | | | 711/154 |
| 2012/0278803 A1* | 11/2012 | Pavlov | G06F 9/45558 |
| | | | 718/1 |
| 2014/0055466 A1* | 2/2014 | Petrov | G06F 9/45533 |
| | | | 345/520 |
| 2014/0176583 A1 | 6/2014 | Abiezzi et al. | |
| 2014/0198122 A1 | 7/2014 | Grossman | |
| 2014/0376606 A1 | 12/2014 | Meier et al. | |
| 2015/0116310 A1* | 4/2015 | Baudouin | G06T 1/60 |
| | | | 345/419 |
| 2016/0328817 A1* | 11/2016 | Yin | G06T 1/20 |

* cited by examiner

METHOD AND APPARATUS FOR DISPLAYING COMPOSITION SCREEN IMAGE BY COMPOSING SCREEN IMAGES OF OPERATING SYSTEMS (OSS)

CROSS-REFERENCE TO RELATED PATENT APPLICATION

This application claims the benefit of U.S. Provisional Patent Application No. 62/113,032, filed on Feb. 6, 2015 in the U.S. Patent and Trademark Office, and claims priority from Korean Patent Application No. 10-2015-0018874, filed on Feb. 6, 2015 in the Korean Intellectual Property Office, the disclosures of which are incorporated herein in their entireties by reference.

BACKGROUND

1. Field

Methods and apparatuses consistent with exemplary embodiments relate to a screen image displaying method performed by an electronic apparatus.

2. Description of the Related Art

Electronic apparatuses are able to execute various operating systems (OSs). For example, electronic apparatuses may execute Android, Tizen, Windows, iOS, MacOS, or the like.

Further, electronic apparatuses are able to execute an OS based on virtualization, which represents an environment in which OSs use identical hardware. For example, Android and Windows can share and use a graphics processing unit (GPU) via virtualization.

SUMMARY

One or more exemplary embodiments include a method and apparatus for displaying a composition screen image by composing screen images of operating systems (OSs).

Additional aspects will be set forth in part in the description which follows and, in part, will be apparent from the description, or may be learned by practice of the exemplary embodiments.

According to an aspect of an exemplary embodiment, a method of composing and displaying screen images includes transmitting a screen image of a guest OS to a host OS, in response to the guest OS and the host OS exclusively or jointly accessing a graphics processing unit (GPU) in a pass-through or mediated-pass-through environment via GPU virtualization; generating a composition screen image by transforming the screen image of the guest OS into a texture and composing the texture with a texture screen image of the host OS; and displaying the composition screen image.

According to an aspect of another exemplary embodiment, an electronic apparatus includes a guest OS which transmits a screen image of the guest OS to a host OS, in response to the guest OS and the host OS exclusively or jointly accessing a GPU in a pass-through or mediated-pass-through environment via GPU virtualization; the host OS which generates a composition screen image by transforming the screen image of the guest OS into a texture and composing the texture with a texture screen image of the host OS; and a display which displays the composition screen image.

According to an aspect of another exemplary embodiment, A a method of composing and displaying screen images includes: transmitting a screen image of a guest operating system (OS) to a host OS, in response to the guest OS and the host OS jointly accessing a graphics processing unit (GPU); generating a composition screen image by transforming the screen image of the guest OS into a texture and composing the texture with a texture screen image of the host OS; and displaying the composition screen image.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
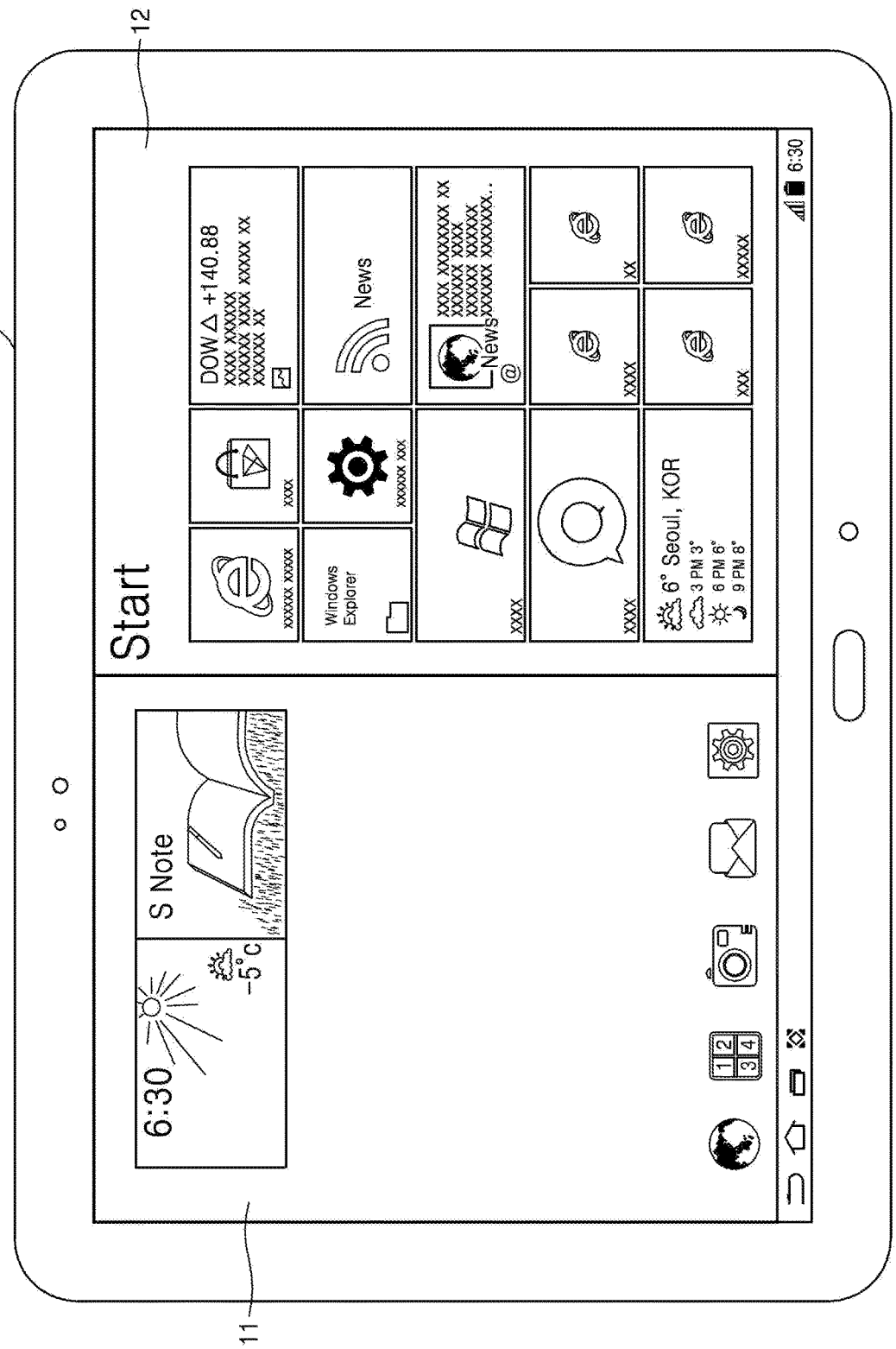
FIG. 1 is a schematic view for explaining a method of displaying a screen image, according to an exemplary embodiment.

Reference will now be made in detail to exemplary embodiments, which are illustrated in the accompanying drawings, wherein like reference numerals refer to the like elements throughout. In this regard, the exemplary embodiments may have different forms and should not be construed as being limited to the descriptions set forth herein. Accordingly, the exemplary embodiments are merely described below, by referring to the figures, to explain aspects of the present description.

FIG. 1 is a schematic view for explaining a method of displaying a screen image, according to an exemplary embodiment. Referring to FIG. 1, an electronic apparatus 1000 may compose and display an Android screen image 11 and a Windows screen image 12. Composing screen images of different OSs may be performed by an OS receiving a screen image of another OS and reconstructing a screen image that is to be output. For example, when Android is a host OS, Android receives the Windows screen image 12 from Windows and changes a format of the Windows screen image 12 to an Android format. Android determines a location on the Android screen image 11, where a changed Windows screen image 12 is to be displayed, and the size with which the changed Windows screen image 12 is to be displayed, and reconstructs the Windows screen image 12 and the Android screen image 11 based on the determined location and the determined size.

The electronic apparatus 1000 may simultaneously execute different OSs. For example, the electronic apparatus 1000 may simultaneously execute Android and Windows. The electronic apparatus 1000 may produce a screen image that is to be displayed, by using a graphics processing unit (GPU). The different OSs may produce screen images thereof via GPU virtualization. The GPU may receive control signals and data from the plurality of OSs via a hypervisor or the like and produce a screen image.

A host OS may receive a screen image of a guest OS and compose the received screen image of the guest OS with a screen image of the host OS. The host OS receives the screen image of the guest OS and composes the received screen image of the guest OS with the screen image of the host OS to produce a composition screen image. The composition screen image becomes a new screen image of the host OS. Since the different OSs are unable to simultaneously display screen images thereof, an OS needs to control another OS. Thus, the host OS may receive the screen image of the guest OS and determine an output form of the screen image of the guest OS. The host OS and the guest OS may be executed by the single electronic apparatus 1000.

The electronic apparatus 1000 may be a mobile phone, a tablet, a wearable device, a camera, a laptop computer, a desktop computer, or the like.

Figure 2:
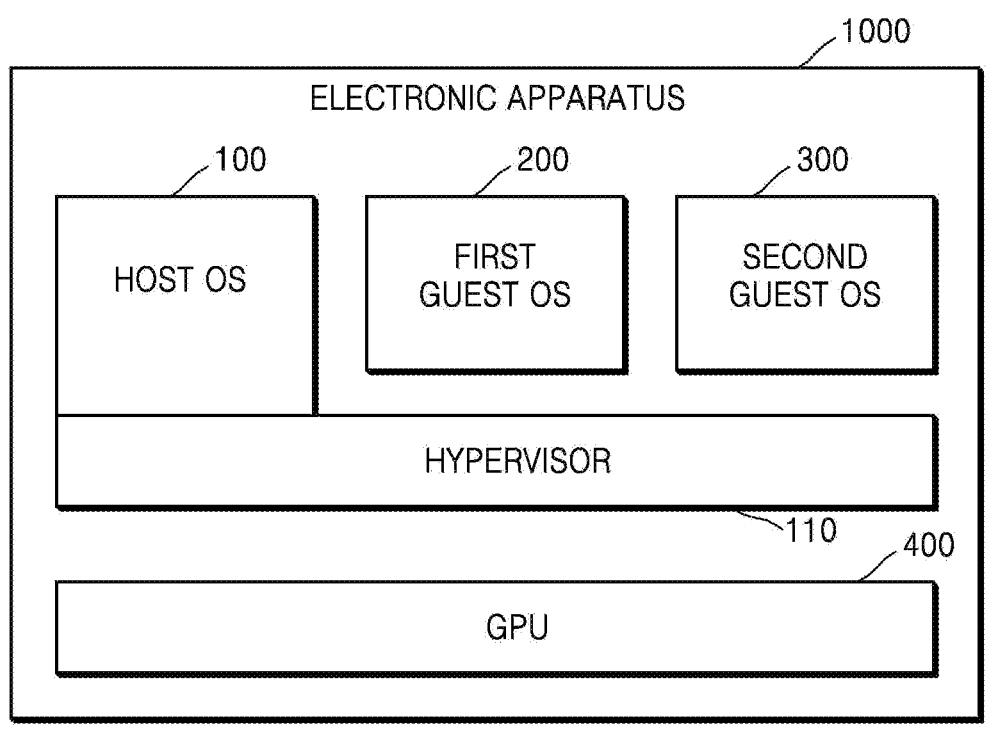
FIG. 2 is a block diagram of an electronic apparatus according to an exemplary embodiment.

FIG. 2 is a block diagram of an electronic apparatus 1000 according to an exemplary embodiment. Referring to FIG. 2, the electronic apparatus 1000 includes a host OS 100, a first guest OS 200, a second guest OS 300, a hypervisor 110, and a graphics processing unit (GPU) 400 (e.g., a graphics processor, etc.). Although not shown in FIG. 2, the electronic apparatus 1000 further includes a display, which displays a screen image, a memory and a processor which are configured to store and execute one or more of the host OS 100, the first guest OS 200, the second guest OS 300, the hypervisor 110.

The host OS 100, the first guest OS 200, and the second guest OS 300 are OSs that are executed by the electronic apparatus 1000. For example, the host OS 100, the first guest OS 200, and the second guest OS 300 may be Android, Tizen, Windows, iOS, or MacOS.

The host OS 100 may control the display to display a composition screen image. The host OS 100 may display a composition screen image by composing a screen image of the first guest OS 200 or the second guest OS 300 with a screen image of the host OS 100.

The host OS 100 may produce and output a composition screen image by composing a screen image received from the first or second guest OS 200 or 300 with a screen image of the host OS 100. Since the first and second guest OSs 200 and 300 are unable to directly output screen images, the screen images are output via the host OS 100. Accordingly, the first and second guest OSs 200 and 300 may transmit the screen images to the host OS 100, or the host OS 100 may read the screen images of the first and second guest OSs 200 and 300 from a frame buffer of a guest. The host OS 100 determines the sizes, positions, shapes, and the like of the screen images of the first and second guest OSs 200 and 300 and composes the screen images of the first and second guest OSs 200 and 300 with the screen image of the host OS 100.

The host OS 100 may change the formats of the screen images of the first and second guest OSs 200 and 300 and compose format-changed screen images of the first and second guest OSs 200 and 300 with the screen image of the host OS 100. Screen images produced by the first and second guest OSs 200 and 300 may have different formats from the format of a screen image produced by the host OS 100. Accordingly, the host OS 100 changes the formats of the screen images of the first and second guest OSs 200 and 300 to be identical with the format of the screen image of the host OS 100.

The hypervisor 110 provides a virtual environment in which the host OS 100, the first guest OS 200, and the second guest OS 300 are able to use hardware. For example, the hypervisor 110 provides a virtual environment in which the host OS 100, the first guest OS 200, and the second guest OS 300 produce screen images by using the GPU 400. In other words, the host OS 100, the first guest OS 200, and the second guest OS 300 share and use the GPU 400 via the hypervisor 110.

FIG. 2 illustrates an example in which the hypervisor 110 is of type 1. Accordingly, the hypervisor 110 may be included in the host OS 100.

The GPU 400 produces a screen image. The GPU 400 may produce screen images of the host OS 100, the first guest OS 200, and the second guest OS 300 according to instructions of the host OS 100, the first guest OS 200, and the second guest OS 300 and output the produced screen images to the display.

Figure 3:
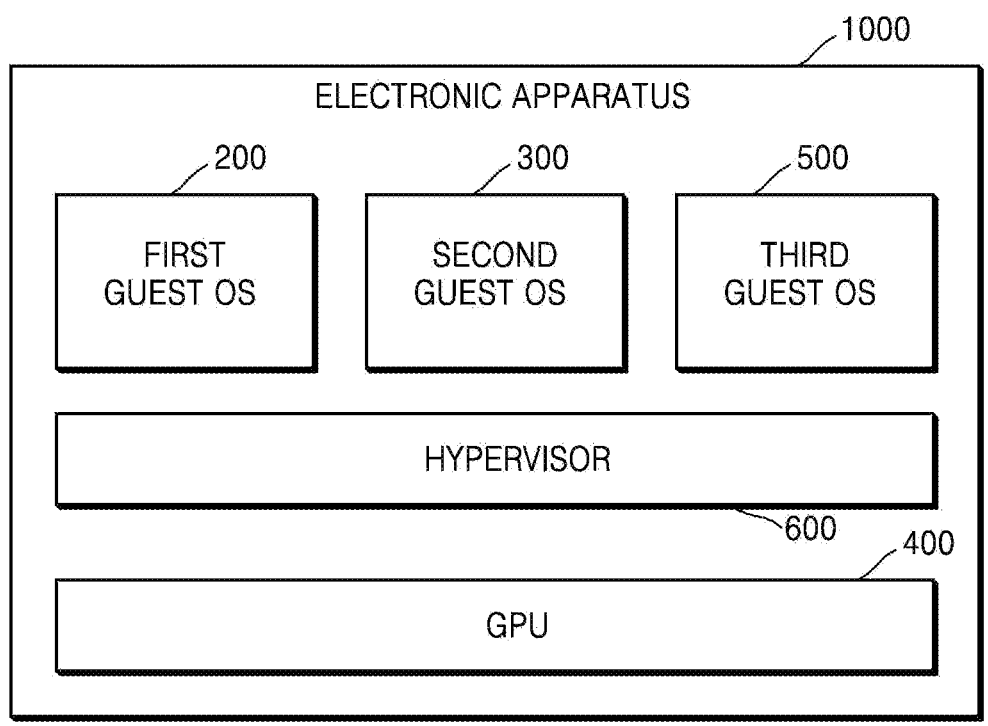
FIG. 3 is a block diagram of an electronic apparatus according to another exemplary embodiment.

FIG. 3 is a block diagram of an electronic apparatus 1000 according to another exemplary embodiment. FIG. 3 illustrates an example in which a hypervisor 600 is of type 2.

When the hypervisor 600 is of type 2, the hypervisor 600 may be implemented separate from first, second, and third guest OSs 200, 300, and 500. When the hypervisor 600 is of type 2, the electronic apparatus 1000 only includes the first, second, and third guest OSs 200, 300, and 500 without the host OS 100. The electronic apparatus 1000 of FIG. 3 is only different from that of FIG. 2 in terms of the implementation form of the hypervisor 600, and the components of the electronic apparatus 1000 of FIG. 3 perform the same functions as those in FIG. 2.

Figure 4:
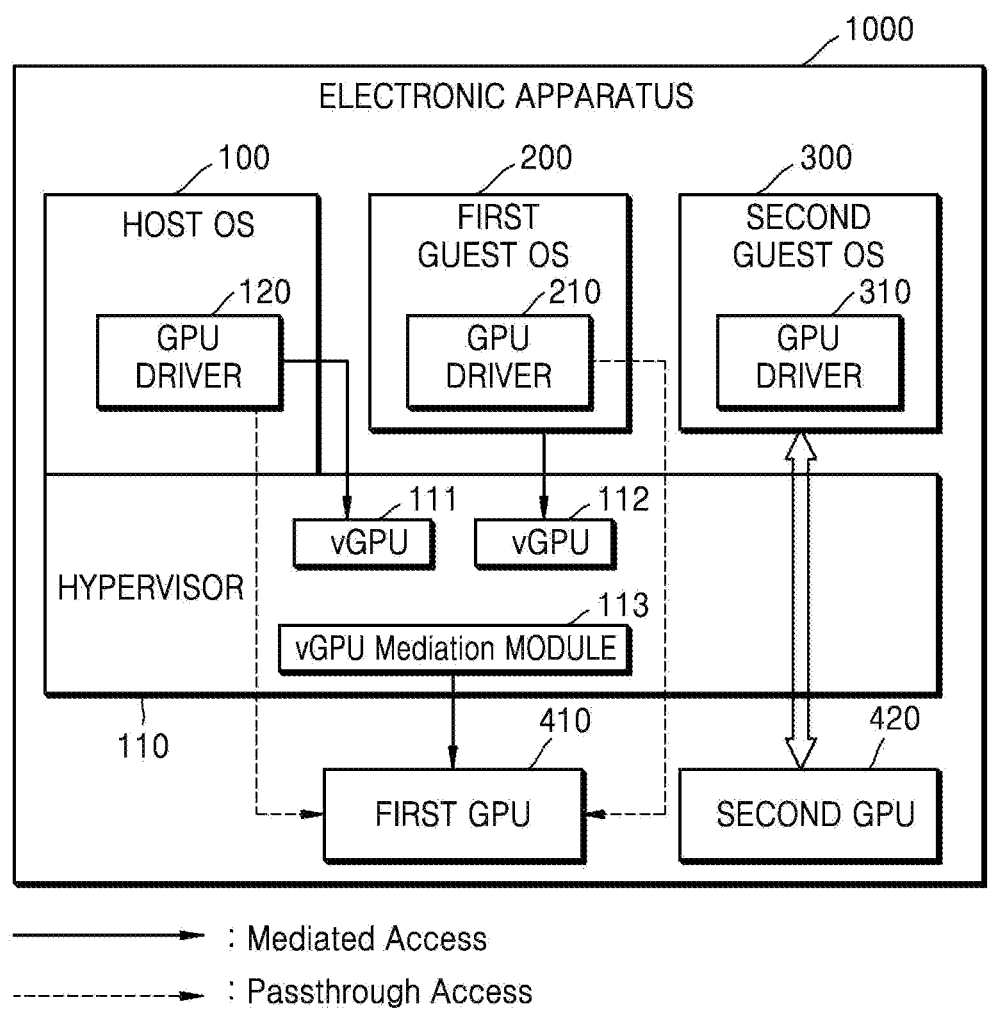
FIG. 4 is a block diagram for explaining a method of transmitting a screen image of a guest operating system (OS) to a host OS.

FIG. 4 is a block diagram for explaining a method of transmitting a screen image of a guest OS to a host OS. Referring to FIG. 4, the host OS 100 includes a GPU driver 120, the first guest OS 200 includes a GPU driver 210, and the second guest OS 300 includes a GPU driver 310. The hypervisor 110 includes virtual graphics processing units (e.g., virtual graphics processors, etc.) (vGPUs) 111 and 112 and a vGPU mediation module 113. The GPU 400 includes first and second GPUs 410 and 420. A solid line indicates a mediated access and a dashed line indicates a pass-through access. The mediated access represents a process of indirectly accessing hardware, and the pass-through access represents a process of directly accessing hardware.

The GPU driver 120 of the host OS 100 may have a pass-through access to the first GPU 410, or have a mediated access to the first GPU 410 via the vGPU 111 and the vGPU mediation module 113. The GPU driver 120 outputs a control signal to the vGPU 111. The control signal may be a signal associated with production of a screen image of the host OS 100. The vGPU 111 outputs a control signal to the vGPU mediation module 113. The GPU driver 120 may directly transmit data to the first GPU 410. For example, the data may represent the contents of the screen image of the host OS 100 in contrast with the control signal, and may be large-capacity data.

The GPU driver 210 of the first guest OS 200 may have a pass-through access to the first GPU 410, or have a mediated access to the first GPU 410 via the vGPU 112 and the vGPU mediation module 113. The GPU driver 210 outputs a control signal to the vGPU 112. The control signal may be a signal associated with production of the screen image of the first guest OS 200. The vGPU 112 outputs the control signal to the vGPU mediation module 113. When the first guest OS 200 accesses a frame buffer register, the vGPU 112 may transmit to the host OS 100 the address of a guest frame buffer that is accessed by the first guest OS 200. Alternatively, the GPU driver 210 may directly transmit the address of the guest frame buffer to the host OS 100. Alternatively, the GPU driver 210 may transmit the address of the guest frame buffer to the host OS 100 via a proxy module of a kernel of the host OS 100. The GPU driver 210 may directly transmit data to the first GPU 410.

The vGPU mediation module 113 manages a schedule of the first GPU 410. Since the vGPU mediation module 113 receives the control signals from the vGPU 111 and the vGPU 112, the vGPU mediation module 113 determines a processing order of the control signals and then controls the first GPU 410.

The GPU driver 310 of the second guest OS 300 has a pass-through access to the second GPU 420. In particular, the second GPU 420 may be a dedicated GPU that is only used by the GPU driver 310. Accordingly, the GPU driver 310 may directly transmit the address of the guest frame buffer to the host OS 100 or transmit the address of the guest frame buffer to the host OS 100 via the proxy module of the kernel of the host OS 100.

Figure 5:
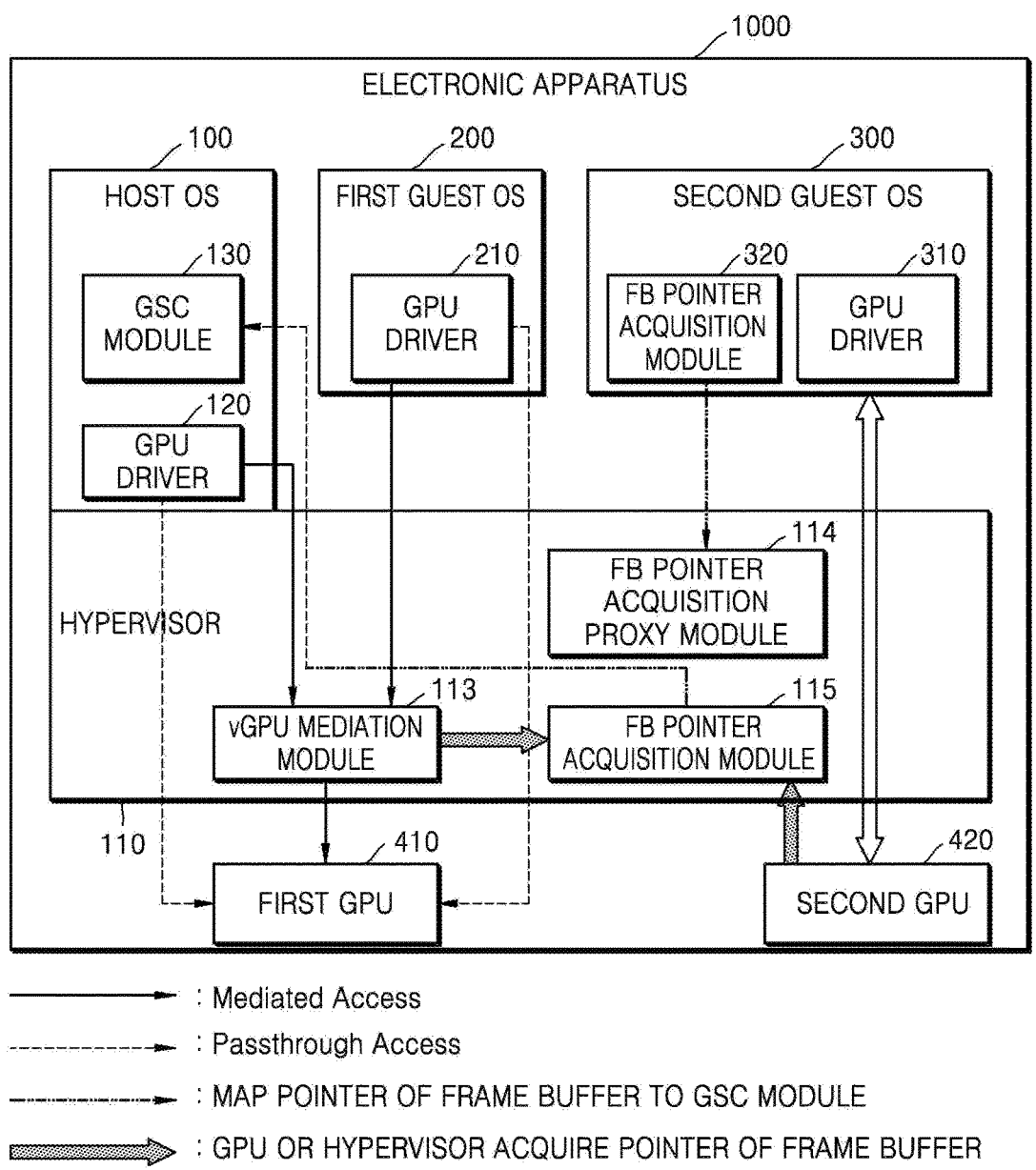
FIG. 5 is a block diagram for explaining a method of transmitting a screen image of a guest OS to a host OS.

FIG. 5 is a block diagram for explaining a method of transmitting a screen image of a guest OS to a host OS. Referring to FIG. 5, the host OS 100 further includes a guest screen composition (GSC) module 130, and the second guest OS 300 further includes a framebuffer (FB) pointer acquisition module 320. The hypervisor 110 further includes an FB pointer acquisition module 115 and an FB pointer acquisition proxy module 114.

The GSC module 130 composes a screen image of the first guest OS 200 or a screen image of the second guest OS 300 with a screen image of the host OS 100. The GSC module 130 receives the address of a guest frame buffer that stores the screen image of the first or second guest OS 200 or 300, from the FB pointer acquisition module 115. The GSC module 130 composes the screen image of the first guest OS 200 or the screen image of the second guest OS 300 with the screen image of the host OS 100, by using data stored in the received address.

The FB pointer acquisition module 115 acquires a pointer of the guest frame buffer. When the GPU driver 310 accesses the second GPU 420, the FB pointer acquisition module 115 acquires a pointer of a guest frame buffer that is accessed by the GPU driver 310, and transmits the acquired pointer to the GSC module 130.

When the GPU driver 310 accesses the second GPU 420, the FB pointer acquisition module 320 of the second guest OS 300 acquires the pointer of the guest frame buffer that is accessed by the GPU driver 310, and transmits the acquired pointer to the FB pointer acquisition proxy module 114.

The FB pointer acquisition proxy module 114 transmits the acquired pointer to the GSC module 130.

The vGPU mediation module 113 hooks a pointer of a guest frame buffer that is accessed by the GPU driver 210 of the first guest OS 200, and transmits the hooked pointer to the FB pointer acquisition module 115. The FB pointer acquisition module 115 transmits the received pointer to the GSC module 130.

Figure 6:
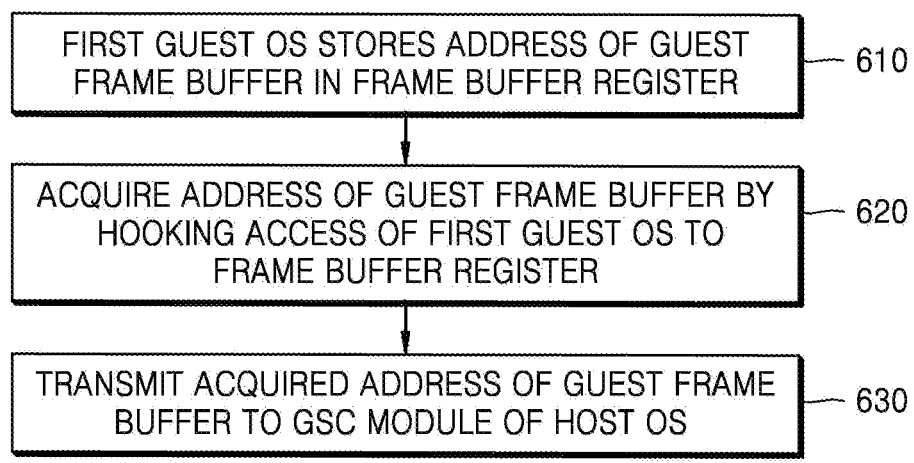
FIG. 6 is a flowchart of a method of transmitting an address of a guest frame buffer to a host OS.

FIG. 6 is a flowchart of a method of transmitting an address of a guest frame buffer to a host OS. In operation 610, the first guest OS 200 stores the address of the guest frame buffer in the frame buffer register.

In operation 620, the vGPU 111 of the host OS 100 acquires the address of the guest frame buffer by hooking an access of the first guest OS 200 to the frame buffer register.

In operation 630, the vGPU 111 transmits the acquired address of the guest frame buffer to the GSC module 130 of the host OS 100.

Figure 7:
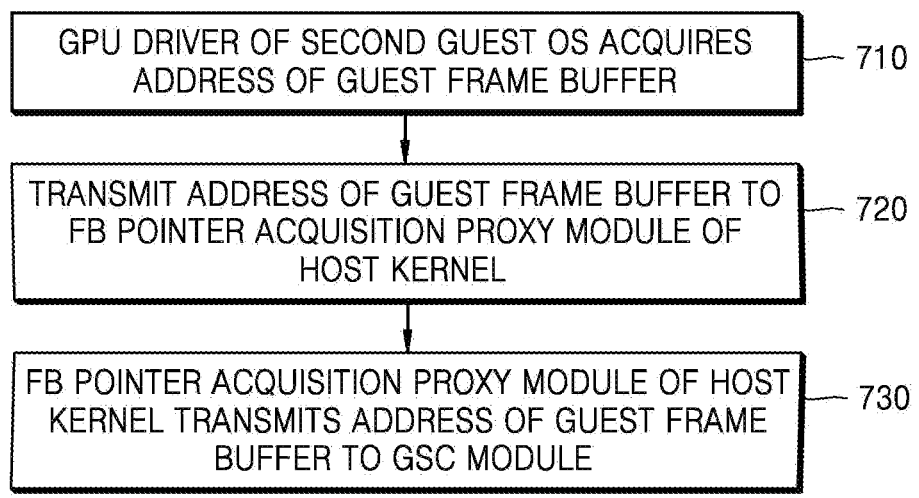
FIG. 7 is a flowchart of a method of transmitting an address of a guest frame buffer to a host OS.

FIG. 7 is a flowchart of a method of transmitting an address of a guest frame buffer to a host OS. In operation 710, the GPU driver 310 of the second guest OS 300 acquires an address of a guest frame buffer. When the second guest OS 300 accesses a guest frame buffer, the GPU driver 310 acquires the address of the accessed guest frame buffer.

In operation 720, the GPU driver 310 transmits the address of the guest frame buffer to the FB pointer acquisition proxy module 114 of a host kernel.

In operation 730, the FB pointer acquisition proxy module 114 transmits the address of the guest frame buffer to the GSC module 130.

Figure 8:
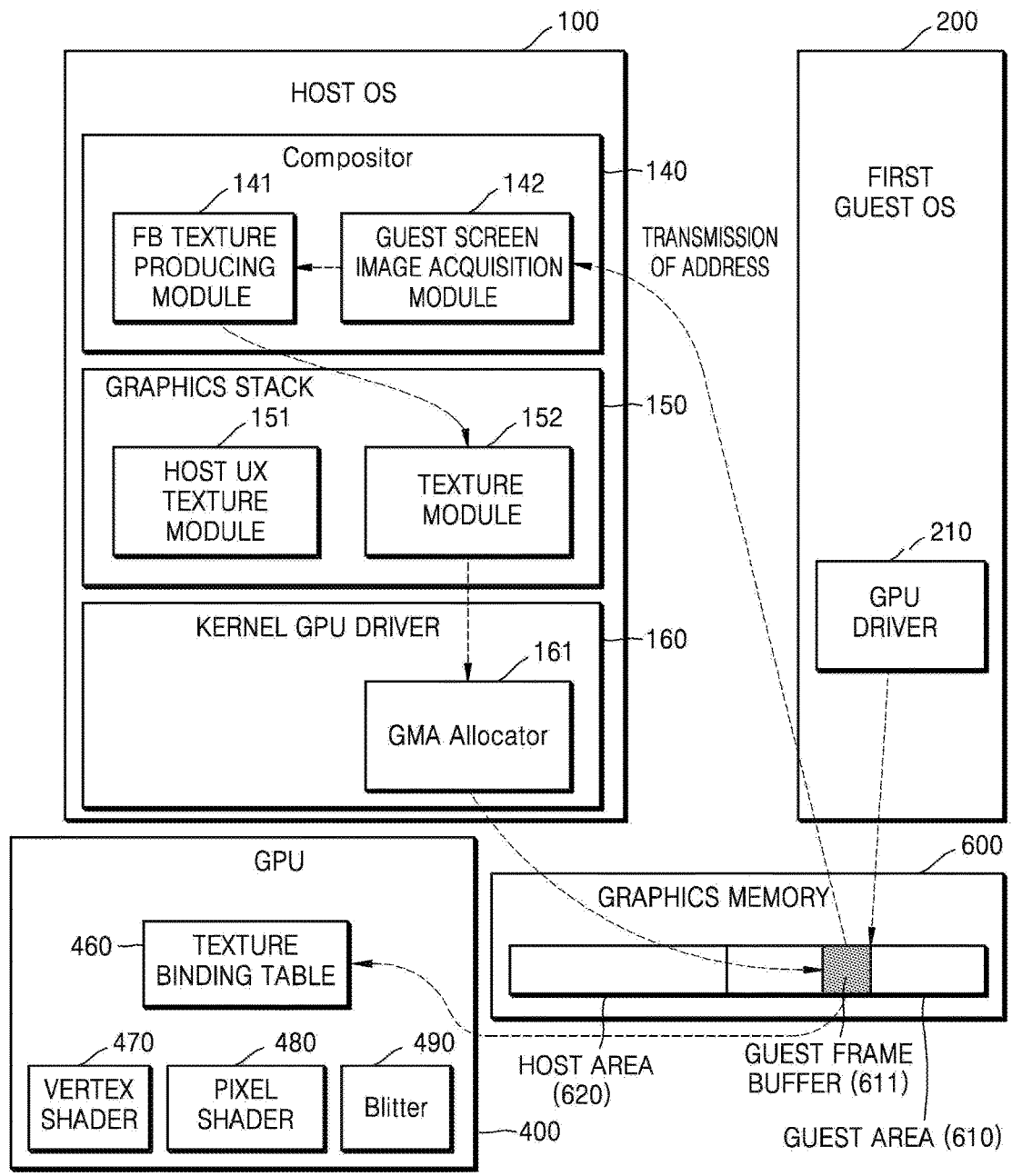
FIG. 8 is a block diagram for explaining a method of composing a screen image of a guest OS and a screen image of a host OS, according to an exemplary embodiment.

FIG. 8 is a block diagram for explaining a method of composing a screen image of a guest OS and a screen image of a host OS, according to an exemplary embodiment. Referring to FIG. 8, the host OS 100 may compose a screen image of the first guest OS 200 that is stored in a guest frame buffer 611 of a graphics memory 600, with a screen image of the host OS 100, via the address of the guest frame buffer

611. The electronic apparatus 1000 may produce a composition screen image by mapping the address of the guest frame buffer 611.

The graphics memory 600 includes a host area 620 and a guest area 610. The host area 620 stores the screen image of the host OS 100, and the guest area 610 stores the screen image of the first guest OS 200. The guest frame buffer 611 is an example of an area in which the screen image of the first guest OS 200 is stored.

The host OS 100 includes a compositor 140, a graphics stack 150, and a kernel GPU driver 160. The compositor 140 includes an FB texture producing module 141 and a guest screen image acquisition module 142. The graphics stack 150 includes a host user experience (UX) texture module 151 and a texture module 152. The kernel GPU driver 160 includes a GMA allocator 161.

The GPU driver 210 of the first guest OS 200 accesses the guest frame buffer 611 of the graphics memory 600. In the guest frame buffer 611, the screen image of the first guest OS 200 is stored. The GPU driver 210 transmits the address of the guest frame buffer 611 to the guest screen image acquisition module 142. The guest screen image acquisition module 142 transmits the received address to the FB texture producing module 141.

The FB texture producing module 141 produces the screen image stored in the guest frame buffer 611 into a texture via mapping. In other words, the FB texture producing module 141 may designate data stored in the address of the guest frame buffer 611 as a texture of the screen image of the first guest OS 200. The FB texture producing module 141 transmits the produced texture to the texture module 152. The texture module 152 manages the received texture. The host UX texture module 151 manages the screen image of the host OS 100.

The GMA allocator 161 allocates a texture object having a space of the address of the frame buffer of the guest as a memory. The texture object represents a memory space for storing an object. In other words, the GMA allocator 161 allocates the address of the guest frame buffer 611 in which the screen image of the first guest OS 200 is stored. The allocated address is transmitted to the GPU 400.

The GPU 400 includes a texture binding table 460, a vertex shader 470, a pixel shader 480, and a blitter 490. The GPU 400 produces a composition screen image that is to be output. The GPU 400 produces the composition screen image by composing the screen image of the host OS 100 and the screen image of the first guest OS 200 stored in the guest frame buffer 611, and outputs the composition screen image to the display.

The frame texture binding table 460 controls format information of the texture. When a format of the guest frame buffer 611 is different from a format of a texture of the host OS 100, the frame texture binding table 460 changes the texture for the screen image of the first guest OS 200 such that the texture has the same format as the texture of the host OS 100.

Figure 9:
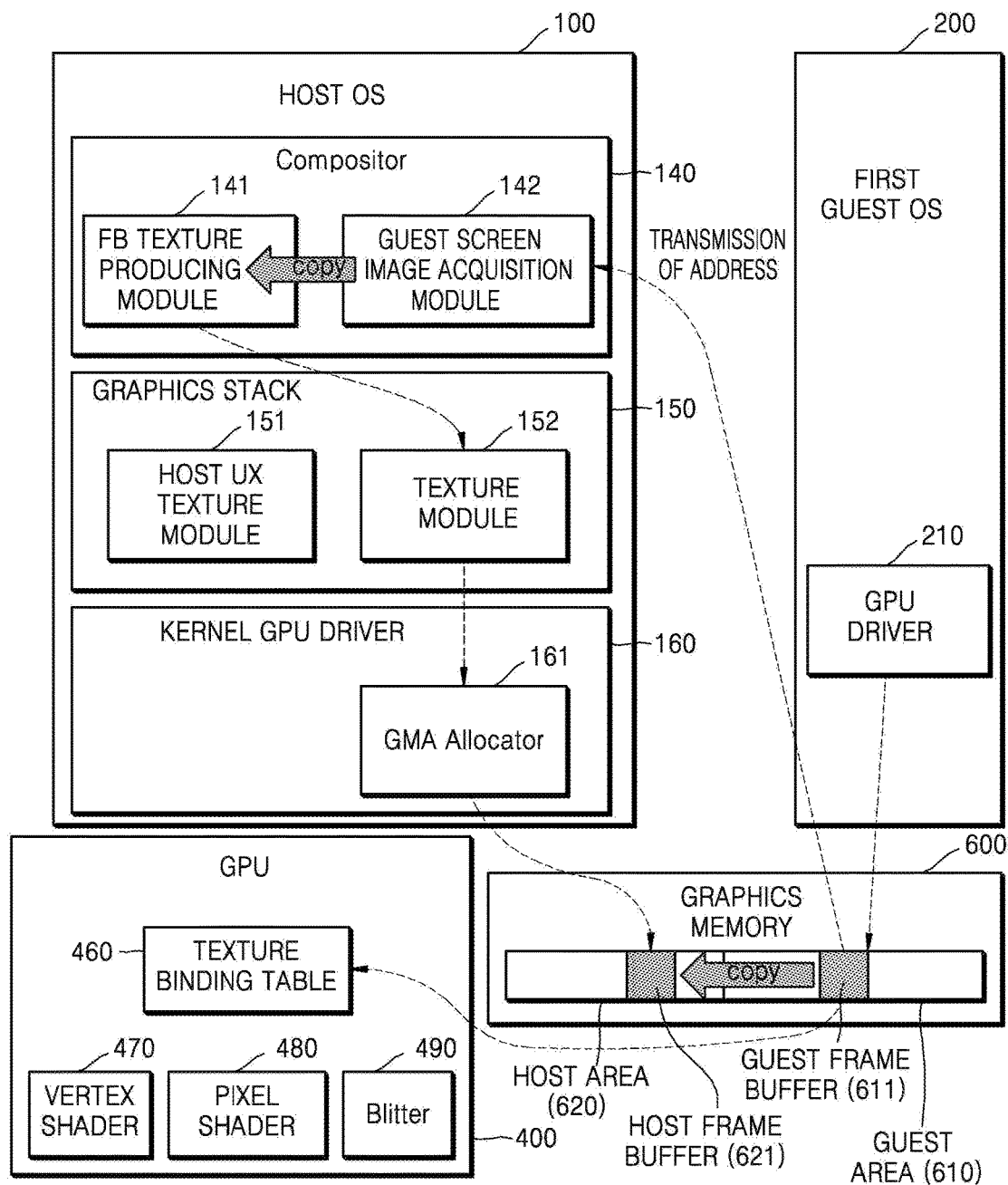
FIG. 9 is a block diagram for explaining a method of composing a screen image of a guest OS and a screen image of a host OS, according to an exemplary embodiment.

FIG. 9 is a block diagram for explaining a method of composing a screen image of a guest OS and a screen image of a host OS, according to an exemplary embodiment. Referring to FIG. 9, an electronic apparatus 1000 may produce a composition screen image by copying the data stored in the guest frame buffer 611. According to the exemplary embodiment of FIG. 9, in contrast with the exemplary embodiment of FIG. 8, the composition screen image is produced by copying and pasting data instead of simply using only an address.

A host frame buffer 621 represents an area where the data stored in the guest frame buffer 611 is copied and then stored. The host frame buffer 621 is included in the host area 610. The FB texture producing module 141 copies data acquired by the guest screen image acquisition module 142 and pastes the copied data to the host frame buffer 621. The FB texture producing module 141 may change the format of the data and paste data having a changed format. Accordingly, the texture binding table 460 produces a composition screen image by using the data stored in the host frame buffer 621.

Figure 10:
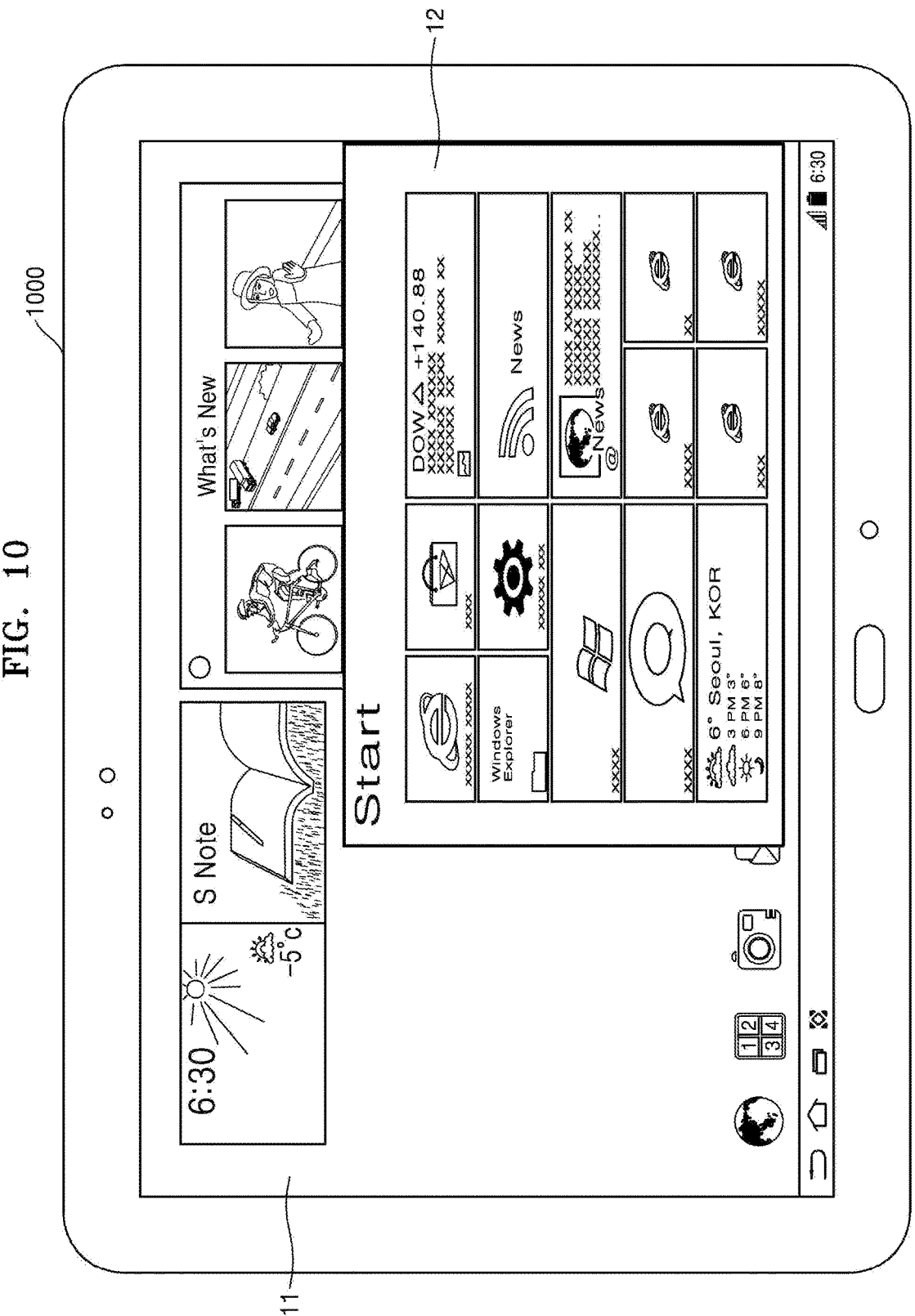
FIG. 10 shows an example of a composition screen image.

FIG. 10 shows an example of a composition screen image. Referring to FIG. 10, the electronic apparatus 1000 may overlap and display the Android screen image 11 and the Windows screen image 12. In FIG. 10, Android may be a host OS and Windows may be a guest OS. Accordingly, the Android screen image 11 is displayed as a full-window and the Windows screen image 12 is displayed as a sub-window. The Windows screen image 12 may be displayed on the Android screen image 11.

The electronic apparatus 1000 may allocate a portion of the Android screen image 11 to the Windows screen image 12. The electronic apparatus 1000 receives the Windows screen image 12 from Windows and makes the format of the Windows screen image 12 be equal to the format of the Android screen image 11. The electronic apparatus 1000 determines on which area of the Android screen image 11 the Windows screen image 12 is to be displayed. In other words, the electronic apparatus 1000 determines the location where, on the entire screen thereof, the Windows screen image 12 is to be displayed and the size with which the Windows screen image 12 is to be displayed. The electronic apparatus 1000 arranges the Windows screen image 12 on the determined location and composes the Windows screen image 12 and the Android screen image 11 to output a composition screen image.

Figure 11:
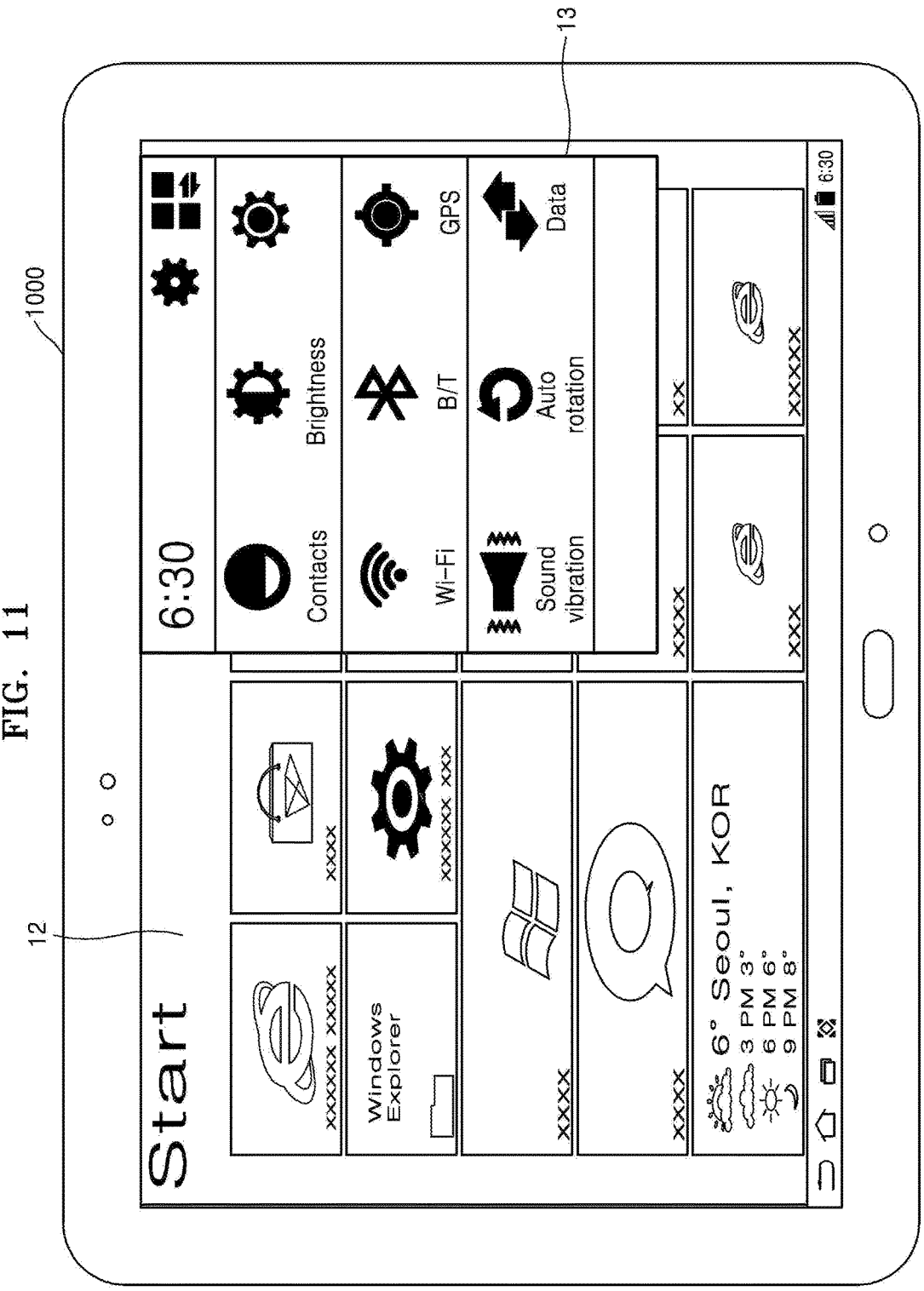
FIG. 11 shows an example of a composition screen image.

FIG. 11 shows an example of a composition screen image. Referring to FIG. 11, the electronic apparatus 1000 may display the Windows screen image 12 and a notification bar 13 at the same time. In FIG. 11, Windows may be a host OS and Android may be a guest OS. Accordingly, the Windows screen image 12 is displayed as a full-window, and the notification bar 13 is displayed on a portion of the Windows screen image 12. The notification bar 13 represents a setting window that is used in Android. The notification bar 13 may appear on or disappear from the screen, via a manipulation of a user.

Figure 12:
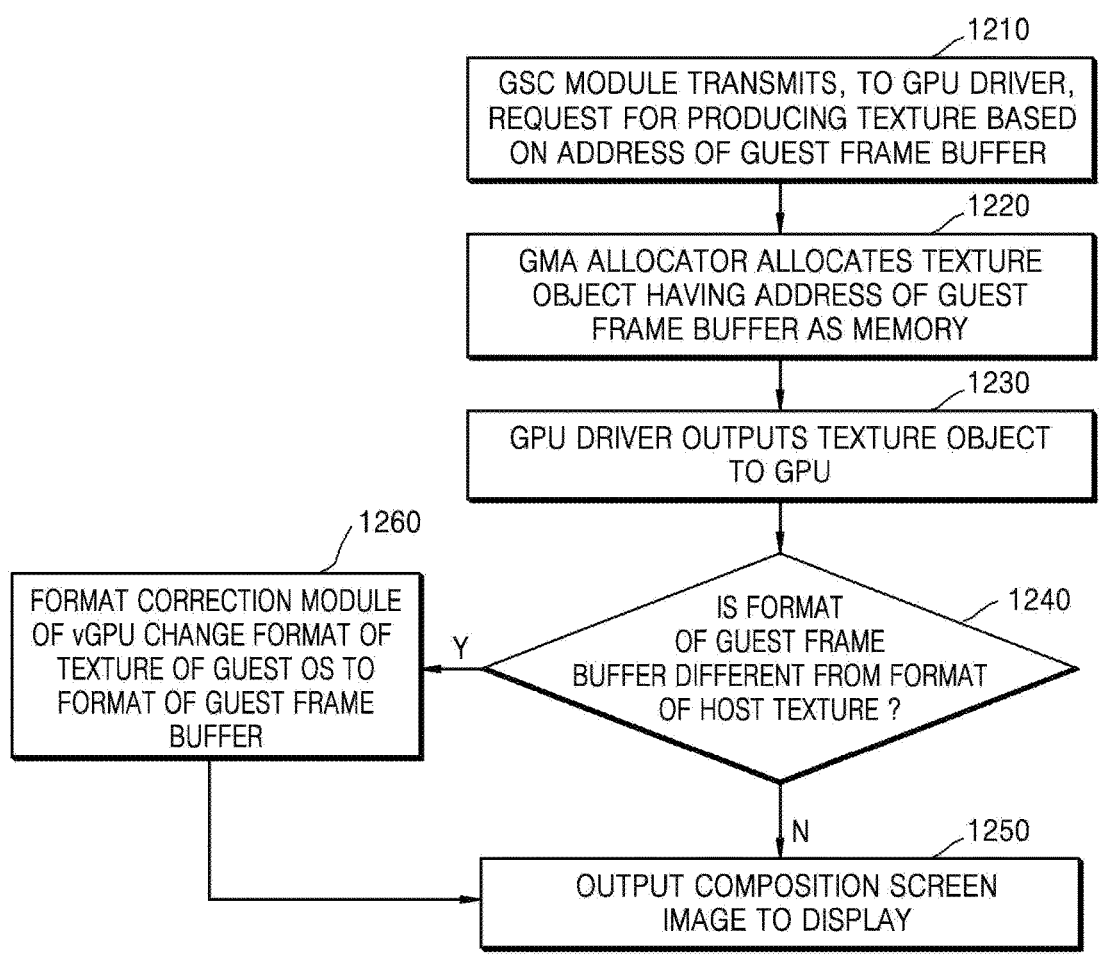
FIG. 12 is a flowchart of a method of outputting a composition screen image.

FIG. 12 is a flowchart of a method of outputting a composition screen image. Referring to FIG. 12, the electronic apparatus 1000 may match a format of the screen image of the host OS with that of the screen image of the guest OS to display a composition screen image.

In operation 1210, the GSC module 130 transmits a request for producing a texture based on the address of the guest frame buffer 611, to the GPU driver 120.

In operation 1220, the GMA allocator 161 allocates a texture object having the address of the guest frame buffer 611 as a memory.

In operation 1230, the GPU driver 120 outputs the texture object to the GPU 400.

In operation 1240, the GPU 400 determines whether the format of the guest frame buffer 611 is different from the format of the host texture. If the format of the guest frame buffer is different from the format of the host texture, the method proceeds to operation 1260. Otherwise, if the format of the guest frame buffer is identical with the format of the host texture, the method proceeds to operation 1250.

In operation 1250, the GPU 400 produces a composition screen image by composing the screen image of the guest OS and the screen image of the host OS, and outputs the composition screen image to the display.

In operation 1260, a format correction module of a vGPU changes the format of a texture of the guest OS to the format of the guest frame buffer or changes the format of the texture of the guest OS to the format of the host texture.

Figure 13:
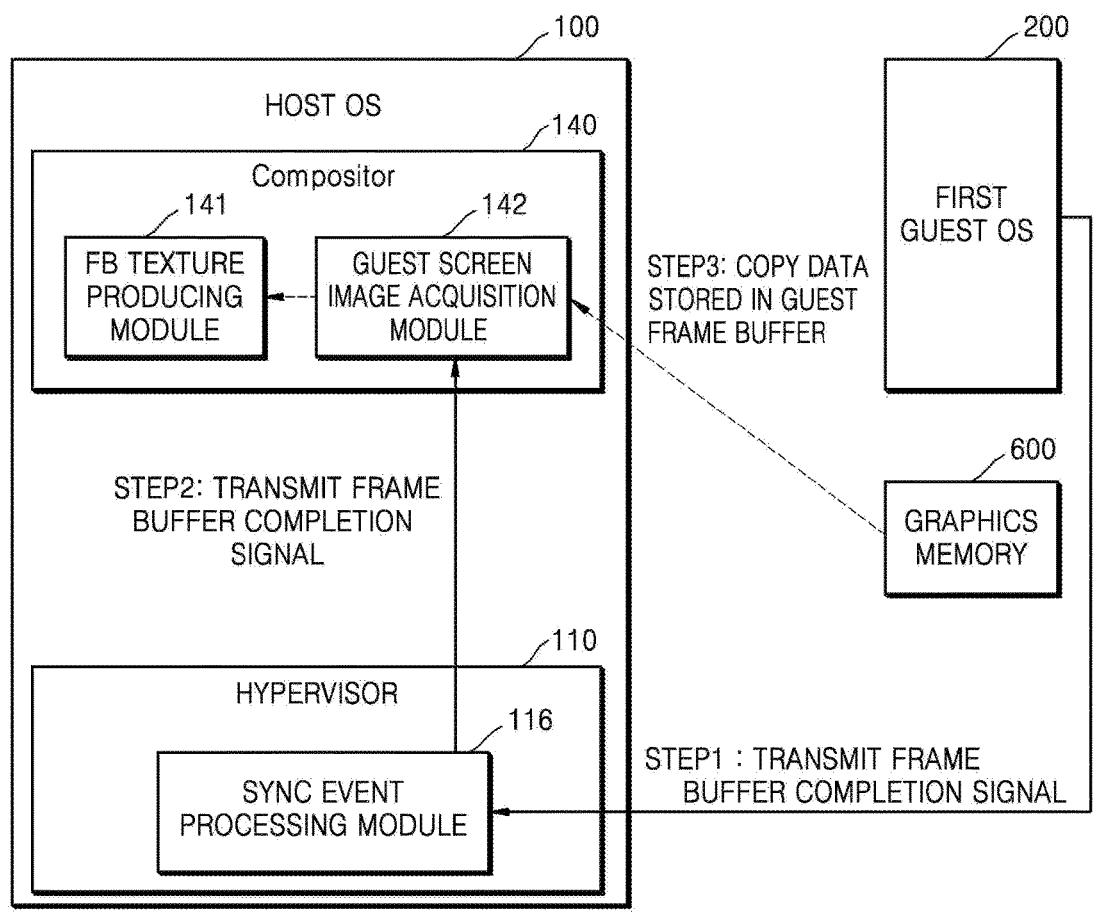
FIG. 13 is a block diagram for explaining an example in which a host OS determines a point in time at which to copy data stored in a guest frame buffer.

FIG. 13 is a block diagram for explaining an example in which the host OS 100 determines a point in time at which to copy data stored in a guest frame buffer. Referring to FIG. 13, the host OS 100 may copy data stored in the guest frame buffer 611 after the host OS 100 receives a signal from the first guest OS 200. When the host OS 100 copies data before the entire data is stored in the guest frame buffer 611, a screen image may be torn. Thus, the host OS 100 copies the data stored in the guest frame buffer 611 after the host OS 100 receives a frame buffer completion signal.

Step1: The first guest OS 200 transmits the frame buffer completion signal to a sync event processing module 116. The first guest OS 200 transmits the frame buffer completion signal to the sync event processing module 116 after a completed screen image is completely stored in the guest frame buffer 611.

Step2: The sync event processing module 116 transmits the frame buffer completion signal to the guest screen image acquisition module 142.

Step3: The guest screen image acquisition module 142 copies the data stored in the guest frame buffer 611 after the guest screen image acquisition module 142 receives the frame buffer completion signal.

According to Step1 through Step3, since data is copied after being stored in the guest frame buffer 611, data that is copied into the FB texture producing module 141 may be prevented from being torn.

Figure 14:
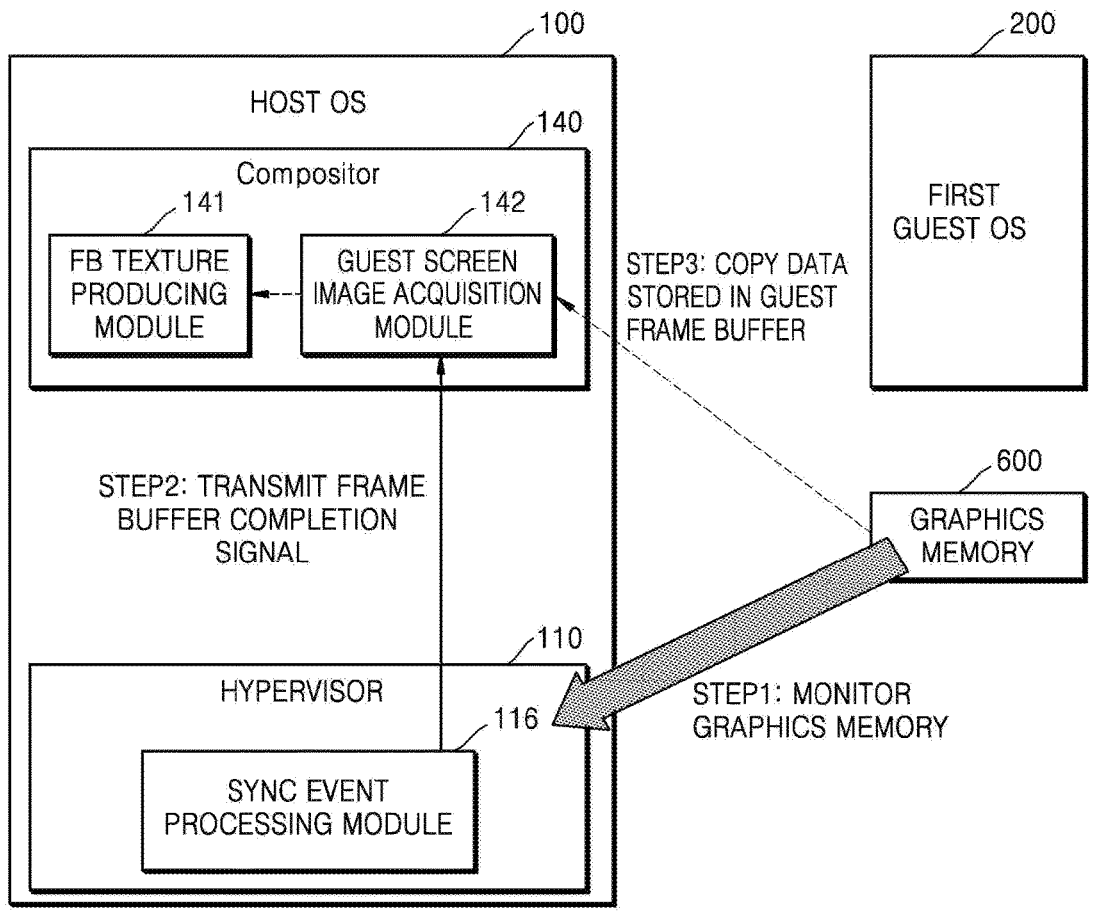
FIG. 14 is a block diagram for explaining another example in which a host OS determines a point in time at which to copy data stored in a guest frame buffer.

FIG. 14 is a block diagram for explaining another example in which the host OS 100 determines a point in time at which to copy data stored in the guest frame buffer. Referring to FIG. 14, the host OS 100 may copy data stored in the guest frame buffer 611 after the host OS 100 receives a signal from the first guest OS 200.

Step1: The hypervisor 110 monitors the graphics memory 600. The hypervisor 110 observes an operation associated with an output of a screen image from the first guest OS 200. For example, the hypervisor 110 may monitor a specific register.

Step2: The sync event processing module 116 transmits the frame buffer completion signal to the guest screen image acquisition module 142. When the first guest OS 200 performs an operation associated with an output of a screen image, the hypervisor 110 transmits the frame buffer completion signal to the guest screen image acquisition module 142.

Step3: The guest screen image acquisition module 142 copies the data stored in the guest frame buffer 611 after the guest screen image acquisition module 142 receives the frame buffer completion signal.

Figure 15:
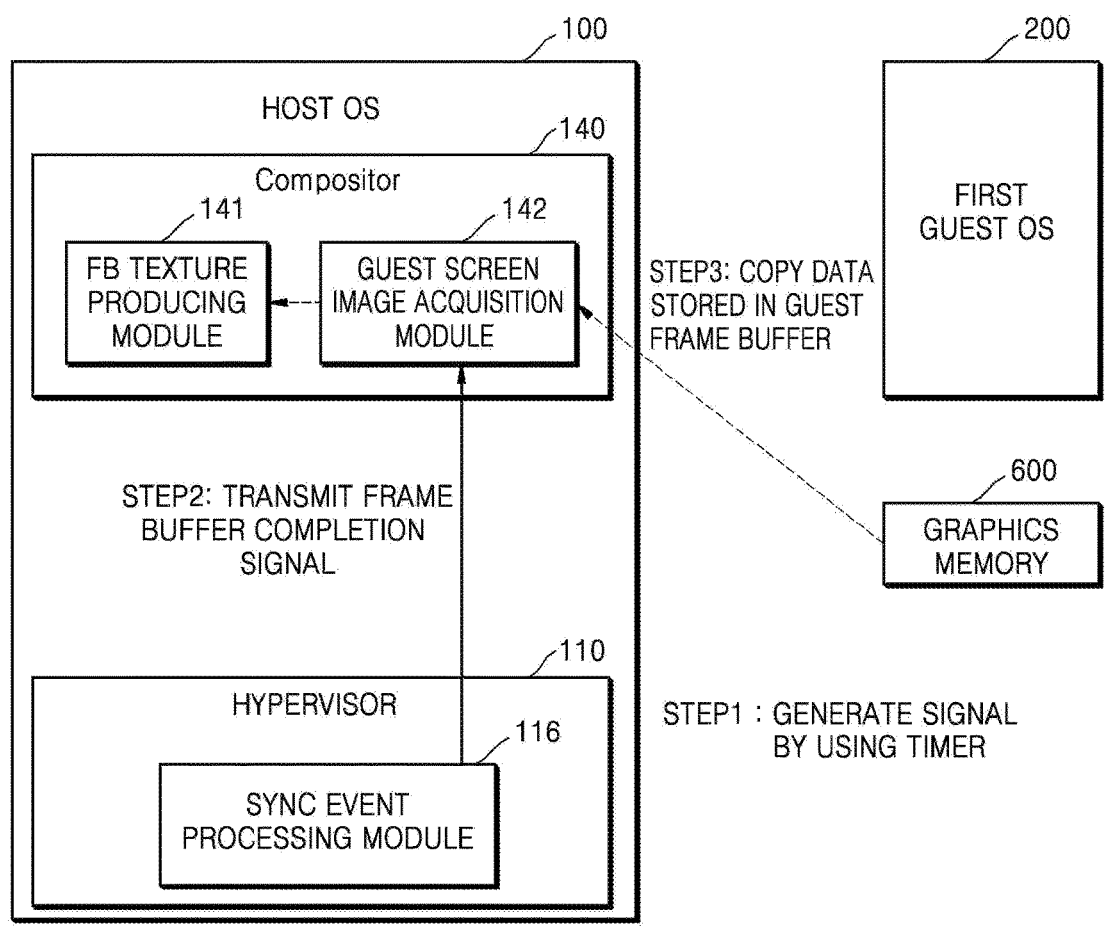
FIG. 15 is a block diagram for explaining another example in which a host OS determines a point in time at which to copy data stored in a guest frame buffer.

FIG. 15 is a block diagram for explaining another example in which the host OS 100 determines a point in time at which to copy the data stored in the guest frame buffer 611. Referring to FIG. 15, the host OS 100 may copy the data stored in the guest frame buffer 611, based on a timer.

Step1: The timer generates a signal at intervals of a preset time period and transmits the generated signals to the hypervisor 110.

Step2: The hypervisor 110 transmits the frame buffer completion signal to the guest screen image acquisition module 142 at intervals of the preset time period. The time period may be set according to a frame per second (FPS). For example, in the case of 30 FPS, the hypervisor 110 transmits the frame buffer completion signal to the guest screen image acquisition module 142 at intervals of 33 ms.

Step3: The guest screen image acquisition module 142 copies the data stored in the guest frame buffer 611 after the guest screen image acquisition module 142 receives the frame buffer completion signal.

Figure 16:
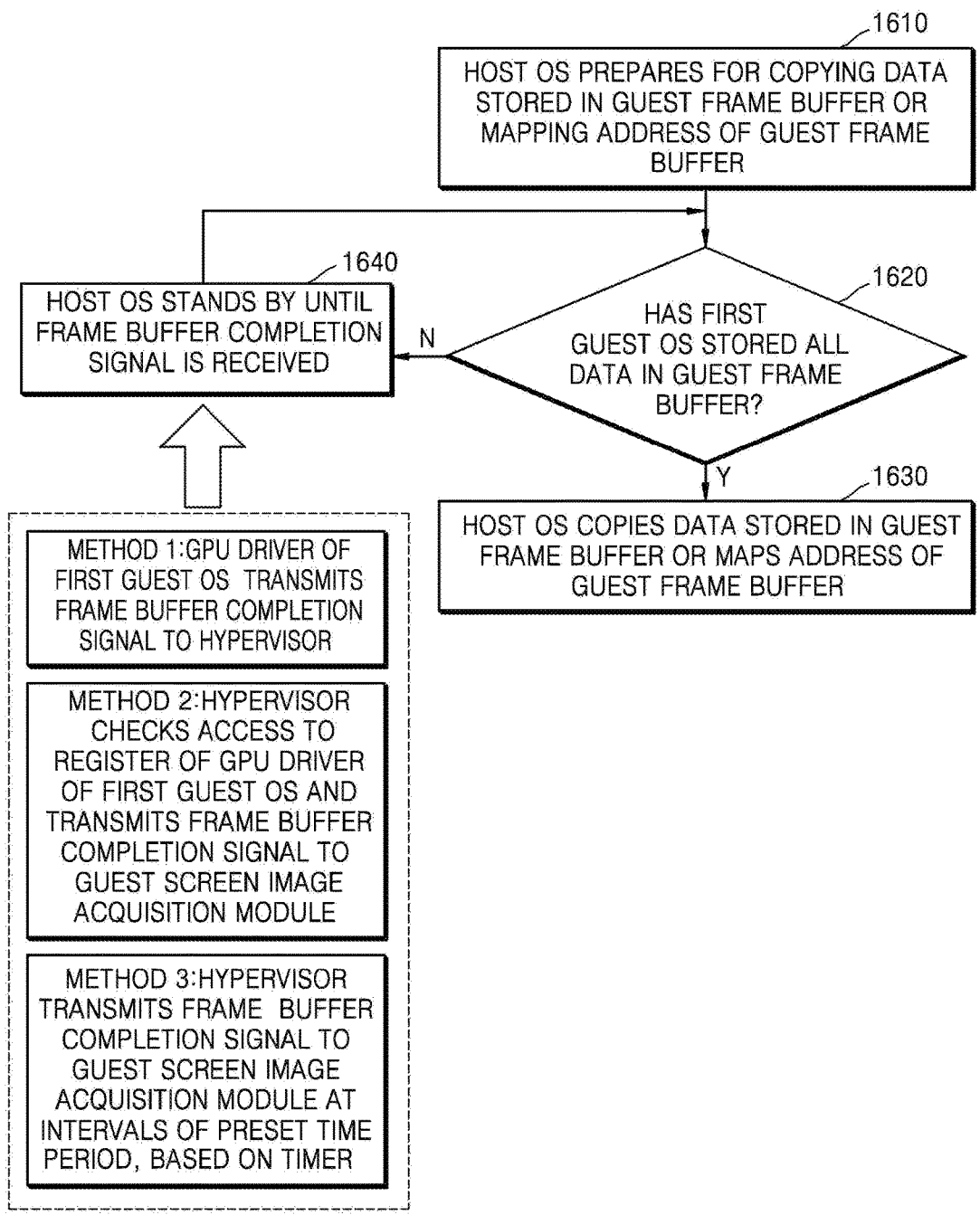
FIG. 16 is a flowchart for explaining a method in which a host OS determines a point in time at which to copy the data stored in a guest frame buffer.

FIG. 16 is a flowchart for explaining a method in which the host OS 100 determines a point in time at which to copy the data stored in the guest frame buffer 611. The host OS 100 may determine the point in time at which to copy the data by using methods 1 through 3.

Method 1 is the method described above with reference to FIG. 13, in which the first guest OS 200 directly produces a frame buffer completion signal and transmits the frame buffer completion signal to the hypervisor 110. When the hypervisor 110 receives the frame buffer completion signal from the first guest OS 200, the hypervisor 110 transmits the frame buffer completion signal to the guest screen image acquisition module 142.

Method 2 is the method described above with reference to FIG. 14, in which the hypervisor 110 checks an access to the register of the GPU driver 210 of the first guest OS 200 and transmits the frame buffer completion signal to the guest screen image acquisition module 142.

Method 3 is the method described above with reference to FIG. 15, in which the hypervisor 110 transmits the frame buffer completion signal to the guest screen image acquisition module 142 based on a signal of the timer.

In operation 1610, the host OS 100 prepares for copying the data stored in the guest frame buffer 611 or mapping the address of the guest frame buffer 611.

In operation 1620, the host OS 100 determines whether the first guest OS 200 has stored all of the data in the guest frame buffer 611. If all of the data has been stored in the guest frame buffer 611, the method proceeds to operation 1630. Otherwise, the method proceeds to operation 1640.

In operation 1630, the host OS 100 copies the data stored in the guest frame buffer 611 or maps the address of the guest frame buffer 611.

In operation 1640, the host OS 100 stands by until the frame buffer completion signal is received. The host OS 100 may receive the frame buffer completion signal from the first guest OS 200 or the hypervisor 110. The host OS 100 may receive the frame buffer completion signal according to methods 1 through 3.

Figure 17:
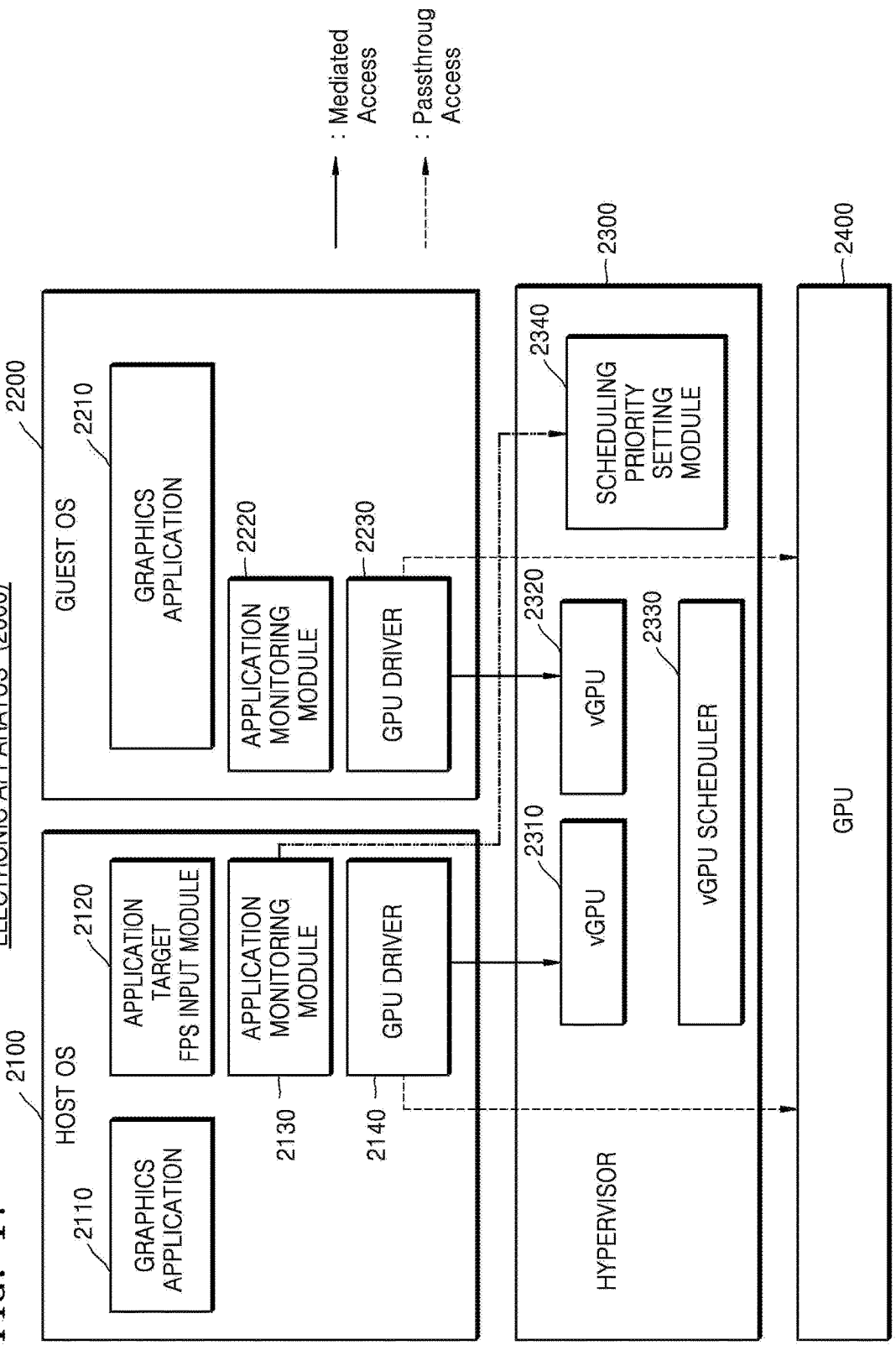
FIG. 17 is a block diagram for explaining a method in which an electronic apparatus according to an exemplary embodiment determines a scheduling priority of a GPU.

FIG. 17 is a block diagram for explaining a method in which an electronic apparatus 2000 according to an exemplary embodiment determines a scheduling priority of a GPU 2400. Referring to FIG. 17, the electronic apparatus 2000 may adjust an FPS of an application by comparing a target FPS with a current FPS.

A host OS 2100 includes a graphics application 2110, an application target FPS input module 2120, an application monitoring module 2130, and a GPU driver 2140. A guest OS 2200 includes a graphics application 2210, an application monitoring module 2220, and a GPU driver 2230. A hypervisor 2300 includes vGPUs 2310 and 2320, and a scheduling priority setting module 2340.

The graphics application 2110 displays graphics. Accordingly, the graphics application 2110 outputs a processing result via the display.

The application target FPS input module 2120 may receive a target FPS for each application from a user. The user may input the target FPS for each application. For example, a target FPS of an application which reproduces a moving picture may be set to be relatively high, and a target FPS of an application which provides a web browser may be set to be relatively low.

The application monitoring modules 2130 and 2220 monitor a current FPS of an application that is being currently executed. The application monitoring module 2130 transmits the current FPS to the scheduling priority setting module 2340.

The scheduling priority setting module 2340 adjusts the current FPS of the application by comparing the target FPS of the application with the current FPS thereof. If the target FPS of the application is lower than the current FPS thereof, the scheduling priority setting module 2340 lowers a priority of the application. On the other hand, if the target FPS of the application is higher than the current FPS thereof, the scheduling priority setting module 2340 increases the priority of the application. In other words, the scheduling priority setting module 2340 may adjust the FPSs of applications to determine priorities of the applications such that the current FPS of an application that is being currently executed approaches a target FPS thereof. The priority denotes which graphic from among respective graphics for a plurality of applications is to be preferentially processed.

Figure 18:
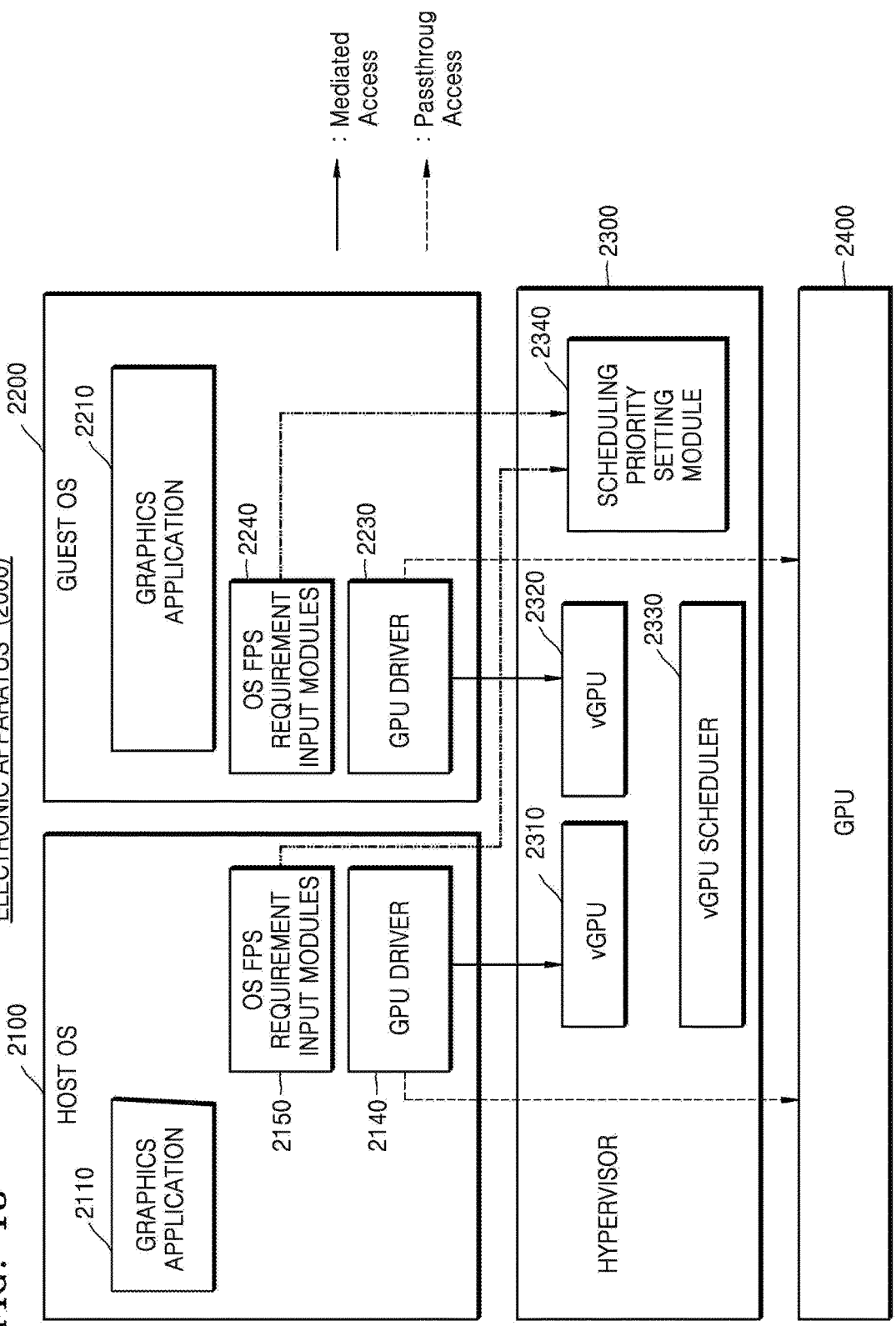
FIG. 18 is a block diagram for explaining a method in which an electronic apparatus according to an exemplary embodiment determines a scheduling priority of a GPU.

FIG. 18 is a block diagram for explaining a method in which an electronic apparatus 2000 according to an exemplary embodiment determines a scheduling priority of a GPU 2400. Referring to FIG. 18, the electronic apparatus 2000 may adjust the FPSs of OSs by determining the priorities of the OSs according to the respective target FPSs of the OSs.

OS FPS requirement input modules 2150 and 2240 receive a target FPS for each OS from a user. The user may input the target FPS for each OS.

The scheduling priority setting module 2340 compares target FPSs of currently-running OSs with current FPSs thereof. If the target FPS of each OS is lower than the current FPS thereof, the scheduling priority setting module 2340 lowers the priority of the OS. On the other hand, if the target FPS of each OS is higher than or equal to the current FPS thereof, the scheduling priority setting module 2340 increases the priority of the OS. In other words, the scheduling priority setting module 2340 may determine priorities of OSs such that the current FPSs of currently-running OSs approach the target FPSs thereof, by adjusting the FPSs of the OSs.

Figure 19:
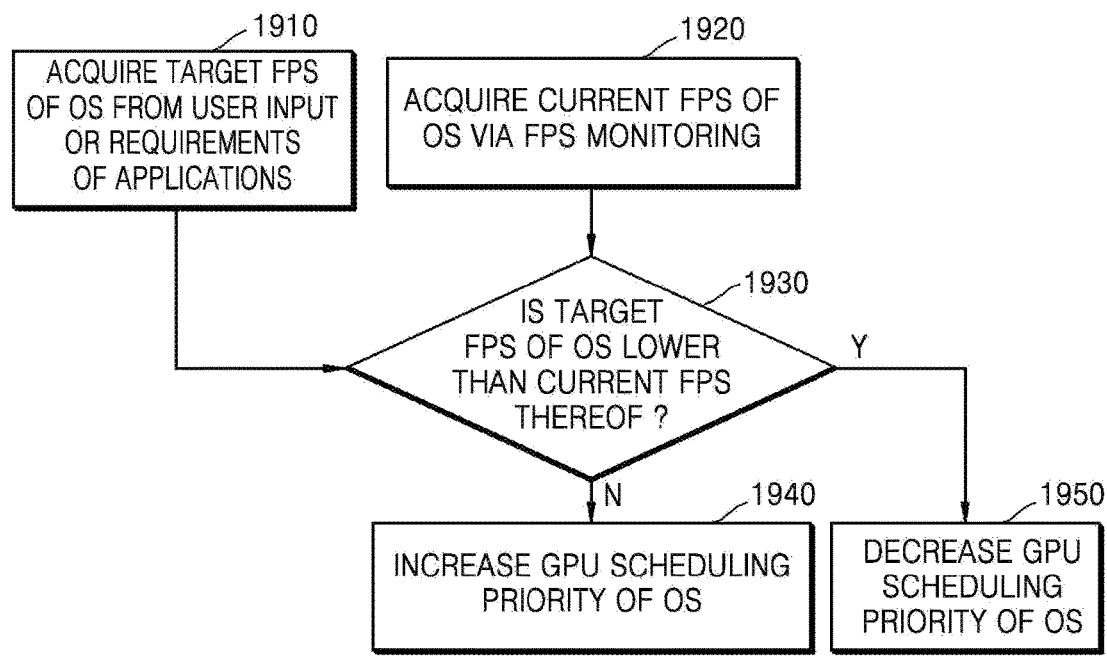
FIG. 19 is a flowchart of a method in which an electronic apparatus according to an exemplary embodiment determines a scheduling priority of a GPU.

FIG. 19 is a flowchart of a method in which the electronic apparatus 2000 according to an exemplary embodiment determines a scheduling priority of the GPU 2400.

In operation 1910, the electronic apparatus 2000 acquires a target FPS of an OS from a user input or requirements of applications. The user may input a target FPS for each OS. The OSs have different requirements. Accordingly, the electronic apparatus 2000 may set the target FPS of the OS based on the requirements of the applications. For example, an application for reproducing a moving picture or an application for executing a game may require a high FPS. Accordingly, the electronic apparatus 2000 may set a target FPS of an OS according to which application the OS executes.

In operation 1920, the electronic apparatus 2000 acquires a current FPS of the OS via FPS monitoring.

In operation 1930, the electronic apparatus 2000 determines whether the target FPS of the OS is lower than the current FPS thereof. If the target FPS is lower than the current FPS, the method proceeds to operation 1950. Otherwise, the method proceeds to operation 1940.

In operation 1940, the electronic apparatus 2000 increases the GPU scheduling priority of the OS.

In operation 1950, the electronic apparatus 2000 decreases the GPU scheduling priority of the OS.

The electronic apparatus 2000 may determine target FPSs of OSs according to a user input or requirements of applications that are being executed by the OSs, and adjust GPU scheduling priorities of the OSs by comparing the determined target FPSs with current FPSs thereof.

Figure 20:
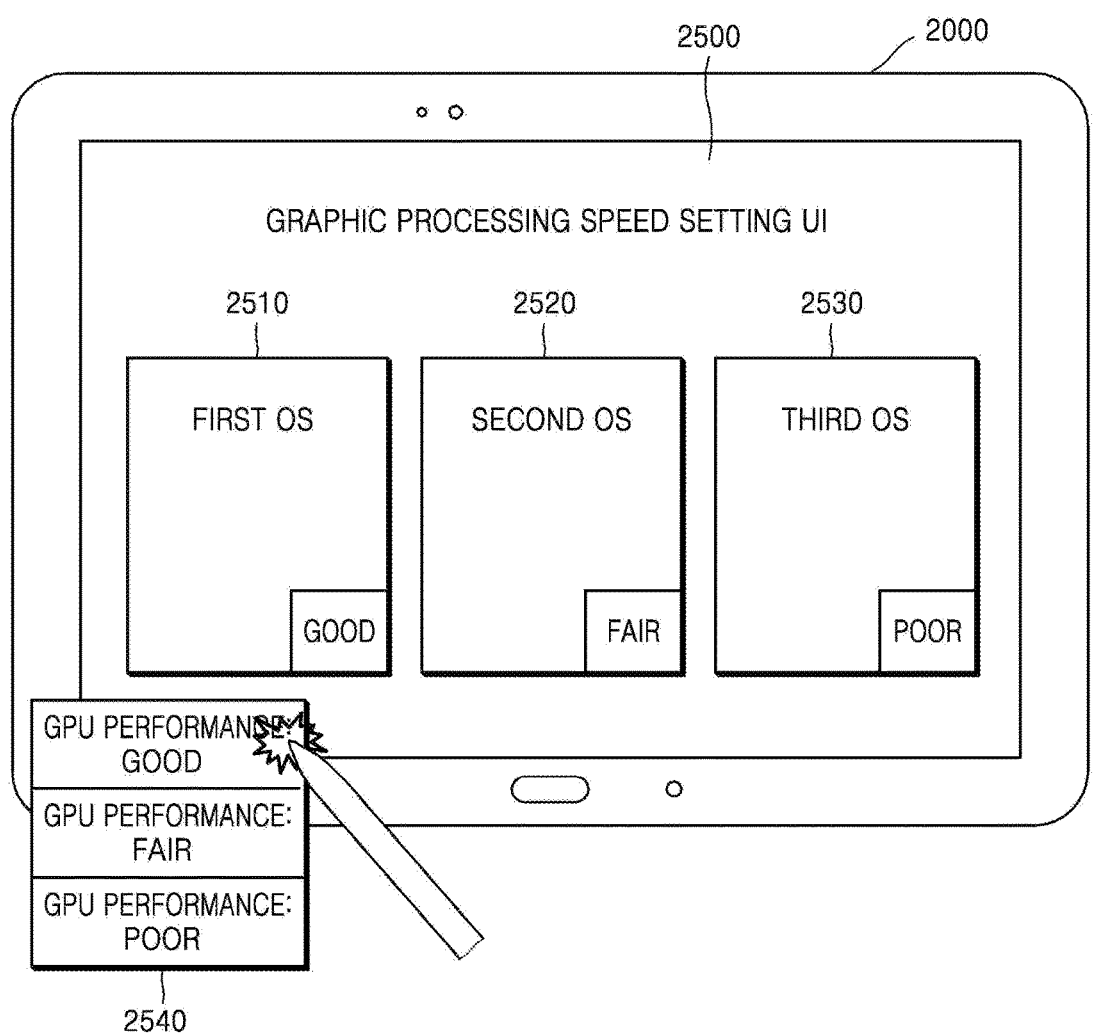
FIG. 20 is a schematic view for explaining an example of setting scheduling of each OS.

FIG. 20 is a schematic view for explaining an example of setting scheduling of each OS. Referring to FIG. 20, the electronic apparatus 2000 may present a list of executable OSs 2510 through 2530 and receive inputs regarding GPU performances of the executable OSs 2510 through 2530 from a user. The electronic apparatus 2000 determines GPU scheduling priorities of the executable OSs 2510 through 2530, based on an input of the user.

The electronic apparatus 2000 displays a graphic processing speed setting UI 2500. The graphic processing speed setting UI 2500 displays the executable OSs 2510 through 2530, which are executable by the electronic apparatus 2000. When the user touches the executable OSs 2510 through 2530, the electronic apparatus 2000 displays a GPU performance UI 2540. When the user selects good, fair, or poor on the GPU performance UI 2540, the electronic apparatus 2000 adjusts the scheduling priorities of the executable OSs 2510 through 2530 based on the selection by the user. For example, an OS with a good performance setting may be given first scheduling priority, an OS with a fair performance setting may be given an intermediate scheduling priority, and an OS with a poor performance setting may be given last scheduling priority.

FIG. 20 illustrates an example in which the GPU performance of the first OS 2510 is set as good, the GPU performance of the second OS 2520 is set as fair, and the GPU performance of the third OS 2530 is set as poor. The GPU performances of the first through third OSs 2510 through 2530 may be changed by a manipulation of the user.

Figure 21:
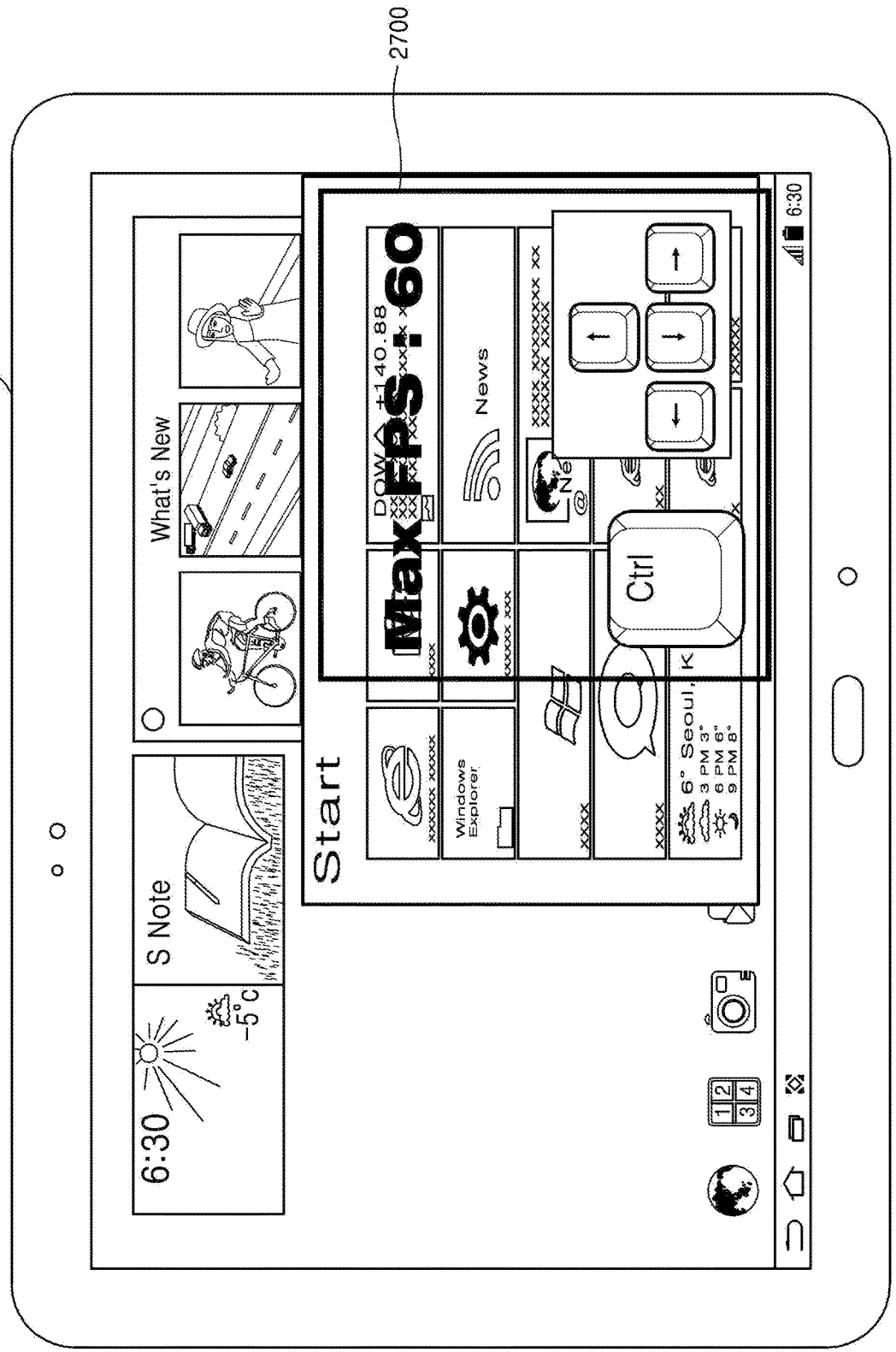
FIG. 21 is a schematic view for explaining an example of adjusting an FPS of each OS.

FIG. 21 is a schematic view for explaining an example of adjusting an FPS of each OS. Referring to FIG. 21, the electronic apparatus 2000 may adjust the FPS of each OS by providing a UI 2700 to a user. The electronic apparatus 2000 displays the UI 2700, such as a virtual keyboard, and receives an input from the user. When the user touches an up arrow, the electronic apparatus 2000 increases the FPS. When the user touches a down arrow, the electronic apparatus 2000 decreases the FPS.

Figure 22:
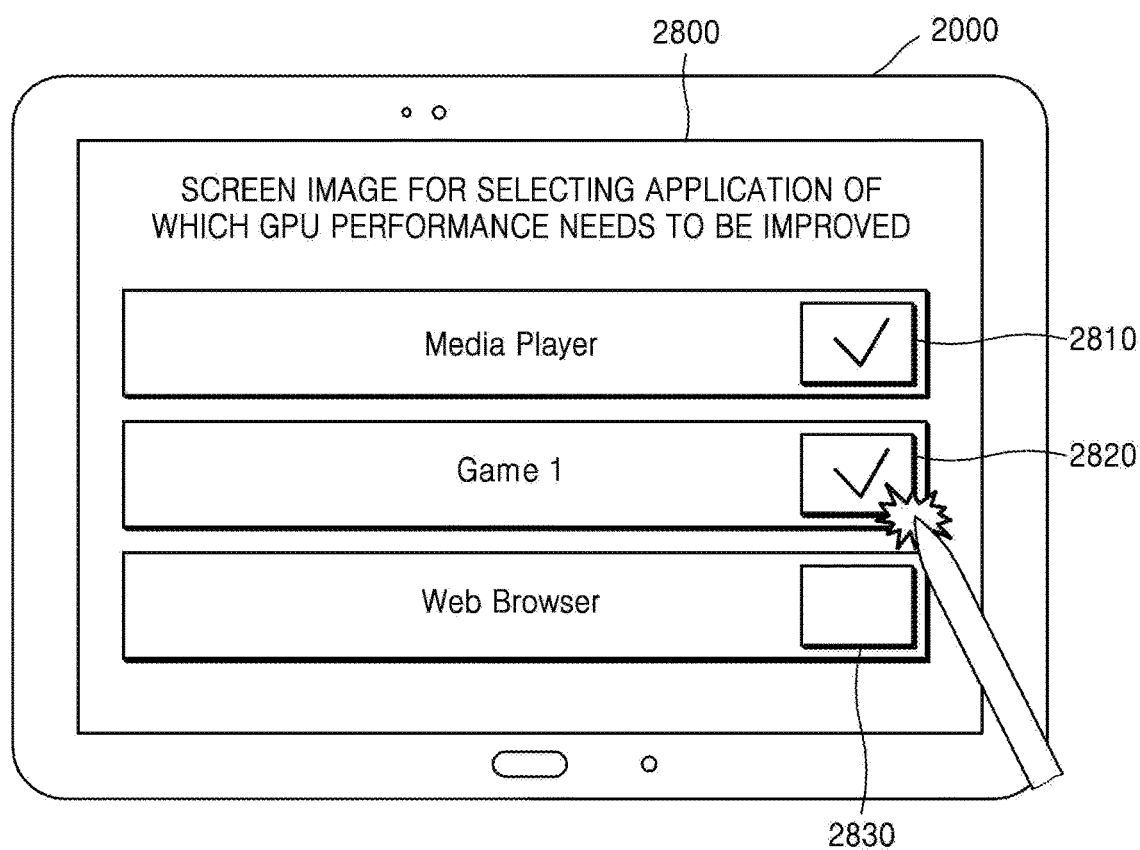
FIG. 22 is a schematic view for explaining an example of adjusting an FPS of each OS according to applications.

FIG. 22 is a schematic view for explaining an example of adjusting an FPS of each OS according to applications. Referring to FIG. 22, the electronic apparatus 2000 may adjust the FPS of each OS by providing a UI 2800 to a user. The electronic apparatus 2000 displays, on the UI 2800, a screen image for selecting an application of which GPU performance needs to be improved, and receives an input from the user. The electronic apparatus 2000 may increase the FPS of an OS that executes the application selected by the user. For example, the user checks a check box 2810 of a media player, checks a check box 2820 of Game 1, and does not check a check box 2830 of a web browser. In this case, the electronic apparatus 2000 may increase the FPS of an OS that executes the media player and the Game 1, compared with another OS.

Figure 23:
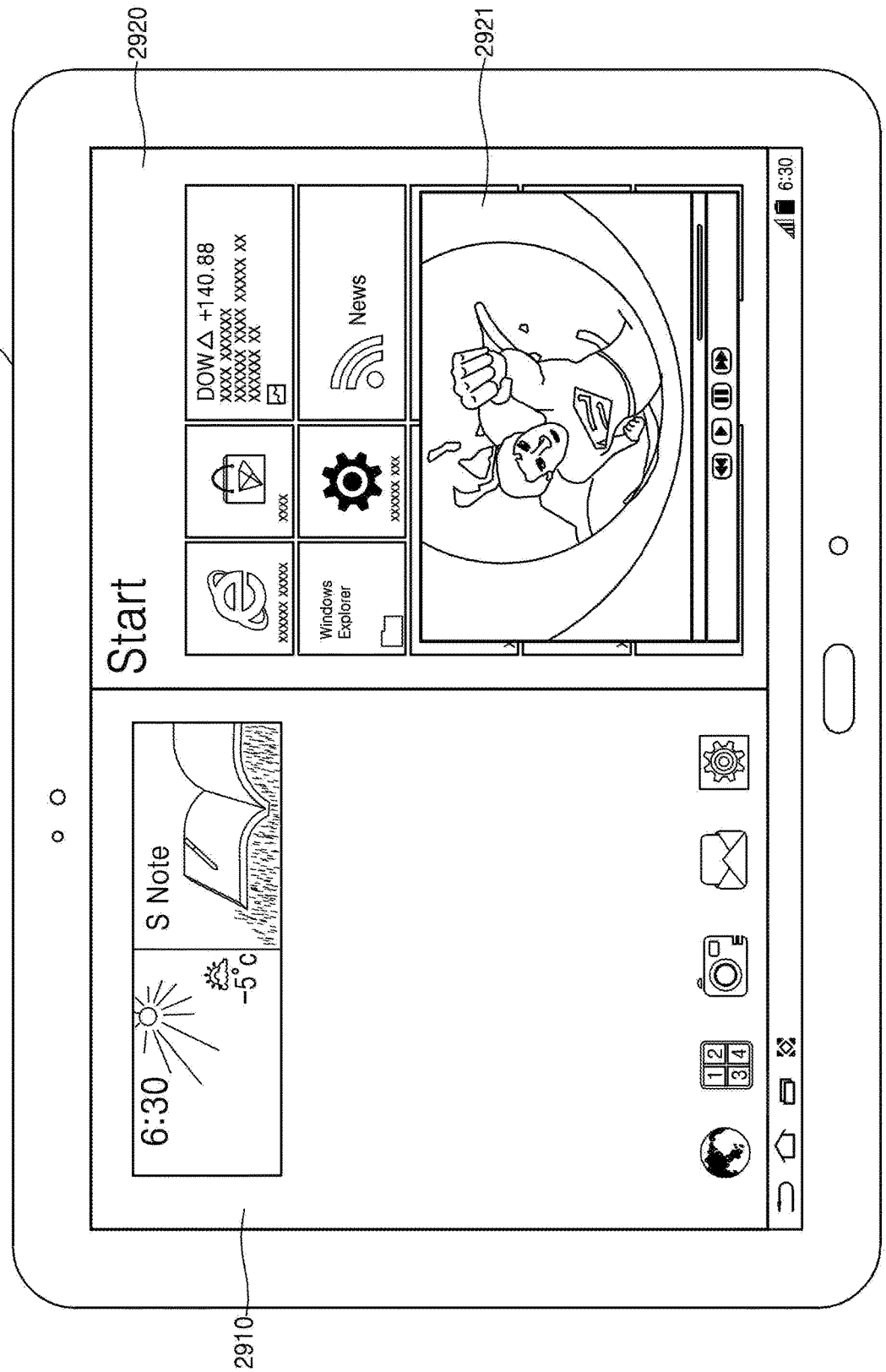
FIG. 23 is a schematic view for explaining an example of adjusting an FPS of each OS according to applications.

FIG. 23 is a schematic view for explaining an example of adjusting an FPS of each OS according to applications. FIG. 23 illustrates a case where a second OS 2920 executes a media player 2921 and the media player 2921 is selected as an application of which GPU performance needs to be improved as in FIG. 22. In this case, the electronic apparatus 2000 may increase the FPS of the second OS 2920, which is executing the media player 2921, to be higher than the FPS of a first OS 2910.

Figure 24:
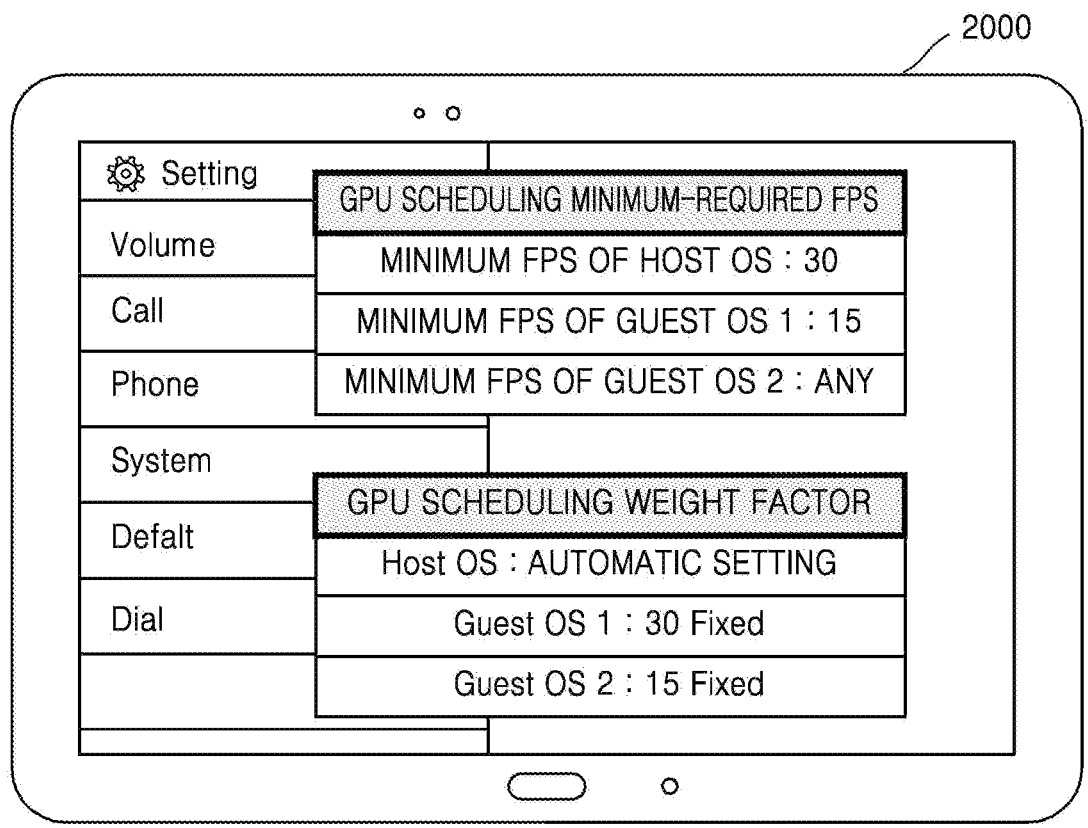
FIG. 24 is a schematic view for explaining an example of setting an FPS of each OS by using a basic settings window.

FIG. 24 is a schematic view for explaining an example of setting an FPS of each OS by using a basic settings window. Referring to FIG. 24, the electronic apparatus 2000 may provide items associated with setting of the FPS to the basic settings window.

The electronic apparatus 2000 may provide the basic settings window with items for setting a GPU scheduling minimum-required FPS. FIG. 24 illustrates a case in which a minimum FPS of a host OS is set as 30, a minimum FPS of a guest OS 1 is set as 15, and a minimum FPS of a guest OS 2 is set as any value.

The electronic apparatus 2000 may provide the basic settings window with items for setting a GPU scheduling weight factor. Referring to FIG. 24, the host OS is set as automatic setting, the guest OS 1 is set as 30 fixed, and the guest OS2 is set as 15 fixed.

When the electronic apparatus 2000 displays the items, the user may change the setting values by using an input unit such as a touch, a virtual keyboard, a voice, a gesture, or the like.

Figure 25:
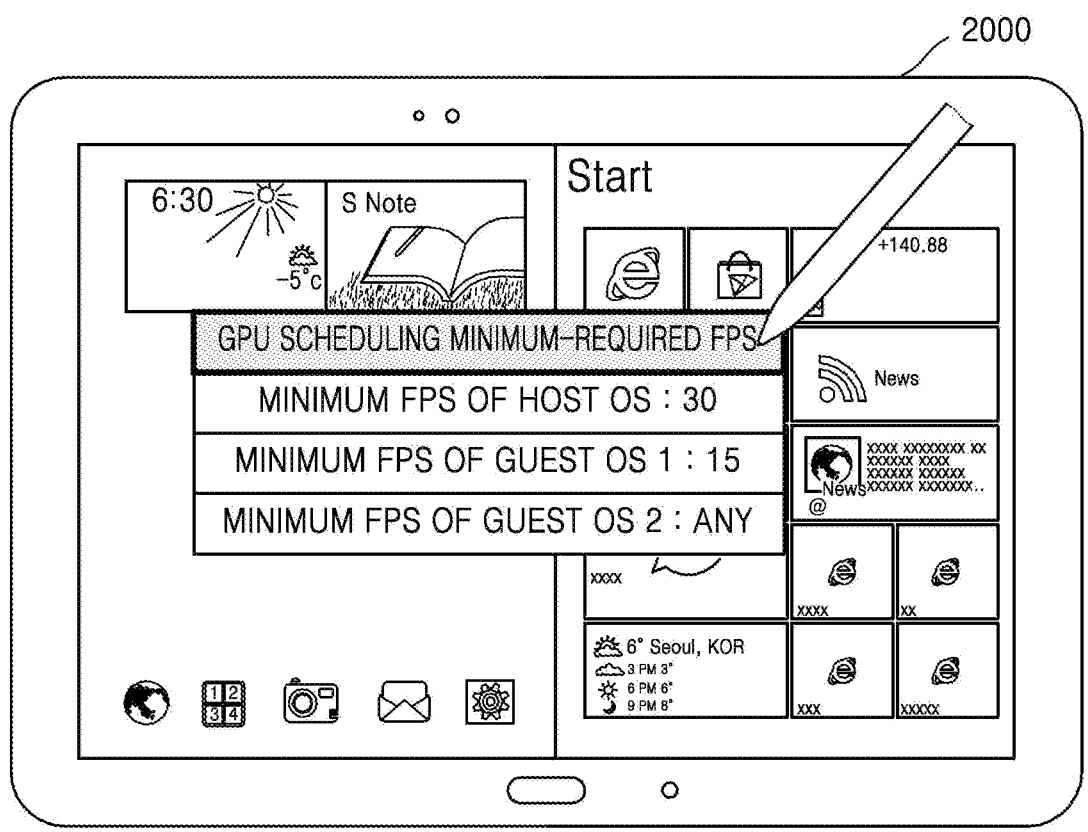
FIG. 25 is a schematic view for explaining an example of setting an FPS of each OS by using a stylus pen.

FIG. 25 is a schematic view for explaining an example of setting an FPS of each OS by using a stylus pen. Referring to FIG. 25, the electronic apparatus 2000 may sense an operation of the stylus pen and display a pop-up window. For example, when a user long-presses, touches, or taps the stylus pen, the electronic apparatus 2000 may display the pop-up window. When the pop-up window is displayed, the user may set FPSs of the host OS and the guest OS.

Figure 26:
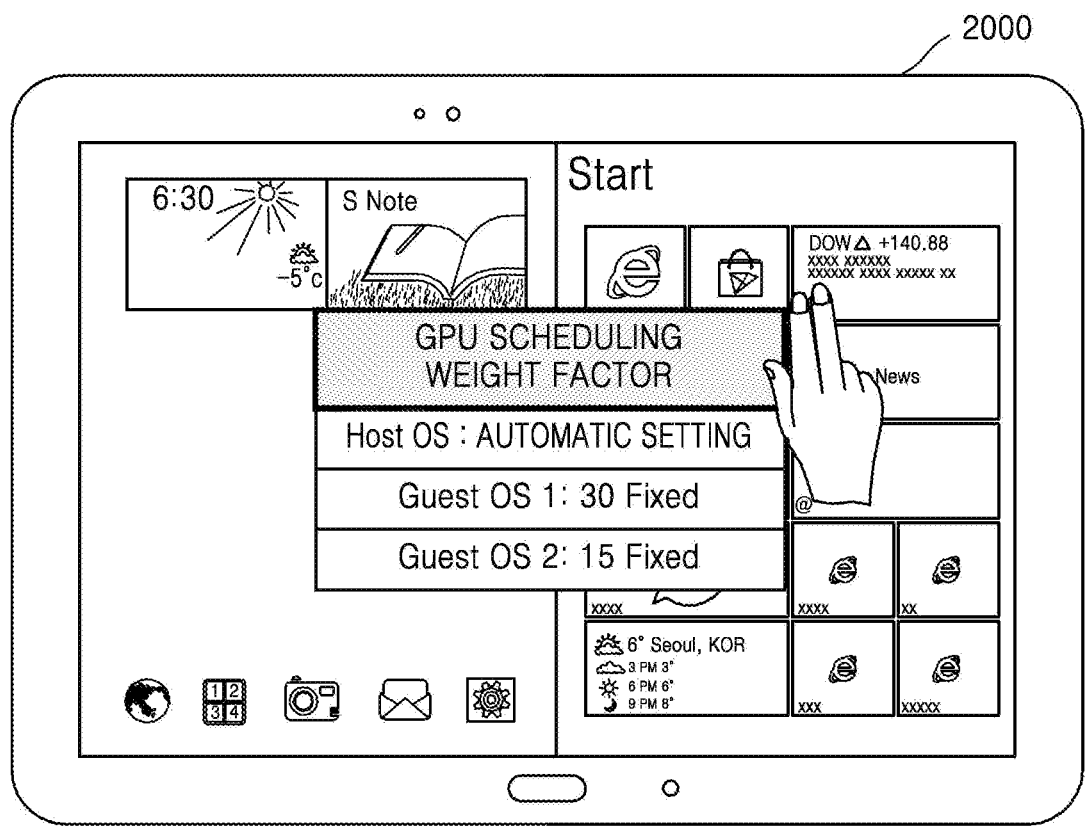
FIG. 26 is a schematic view for explaining an example of setting an FPS of each OS by using a finger of a user.

FIG. 26 is a schematic view for explaining an example of setting an FPS of each OS by using a finger of a user. Referring to FIG. 26, the electronic apparatus 2000 may sense an operation of the finger of the user and display a pop-up window. For example, when the user long-presses, touches, or taps the electronic apparatus 2000 by using the finger, the electronic apparatus 2000 may display the pop-up window. When the pop-up window is displayed, the user may set FPSs of the host OS and the guest OS.

Figure 27:
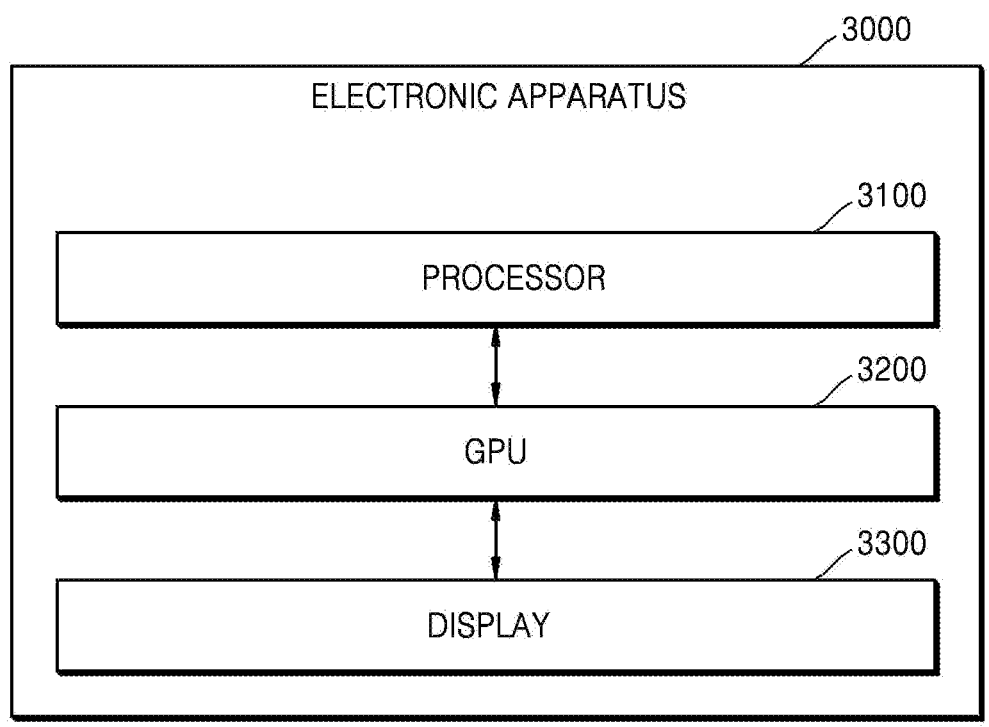
FIG. 27 is a block diagram of an electronic apparatus according to an exemplary embodiment.

FIG. 27 is a block diagram of an electronic apparatus 3000 according to an exemplary embodiment. The electronic apparatus 3000 includes a processor 3100, a GPU 3200, and a display 3300. The electronic apparatus 3000 may compose and display screen images of a plurality of OSs or adjust FPSs of the plurality of OSs.

The processor 3100 may drive a plurality of OSs, a hypervisor, various types of modules, and a driver illustrated in the previous drawings. Accordingly, matters related to the plurality of OSs, the hypervisor, the various types of modules, and the driver illustrated in the previous drawings are equally applied to the processor 3100 of FIG. 27.

The processor 3100 may compose the screen image of the host OS and the screen image of the guest OS. The processor 3100 may produce a composition screen image by mapping the address of a guest frame buffer in which the screen image of the guest OS is stored. The processor 3100 may produce a composition screen image by copying the screen image of the guest OS. The processor 3100 may determine how to compose the screen image of the host OS and the screen image of the guest OS, and control the GPU 3200 to display the composition screen image on the display 3300.

The processor 3100 may determine scheduling priorities of the GPU 3200 of applications or determine scheduling priorities of OSs.

The GPU 3200 generates a screen image under the control of the processor 3100 and outputs the screen image to the display 3300. The GPU 3200 may generate the composition screen image by composing the screen image of the host OS and the screen image of the guest OS under the control of the processor 3100. The GPU 3200 may use data stored in a frame buffer or the like of a guest. The GPU 3200 may be controlled by a plurality of OSs via virtualization.

The display 3300 displays the composition screen image received from the GPU 3200.

The display 3300 may receive an input of a user and output the user input to the processor 3100. For example, the display 3300 may sense long-pressing, touching, or tapping of a stylus pen or a finger and output a result of the sensing to the processor 3100.

The processor 3100 may control the display 3300 to display a pop-up window for FPS setting, based on the result of the sensing.

Figure 28:
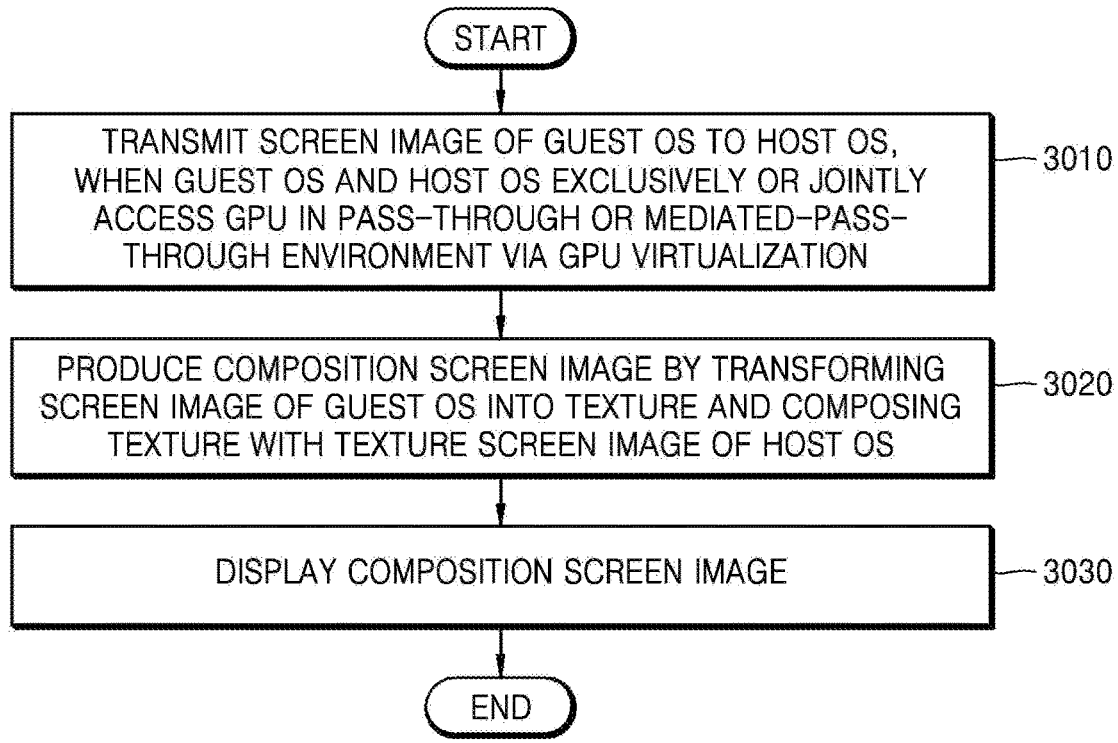
FIG. 28 is a flowchart of a method of composing and displaying screen images, according to an exemplary embodiment.

FIG. 28 is a flowchart of a method of composing and displaying screen images, according to an exemplary embodiment. Referring to FIG. 28, in operation 3010, the processor 3100 of the electronic apparatus 3000 transmits the screen image of the guest OS to the host OS, when the guest OS and the host OS exclusively or jointly access the GPU 3200 in a virtualization environment.

For example, the processor 3100 may check the address of the guest frame buffer in which the screen image of the guest OS is stored, and may transmit the address of the guest frame buffer to the host OS.

In another example, the guest OS may directly transmit the address of the guest frame buffer to the host OS or transmit the address of the guest frame buffer to the host OS via the hypervisor.

For example, the processor 3100 may transmit the address of the guest frame buffer to the host OS after the processor 3100 receives a signal from the guest OS, or transmit the address of the guest frame buffer to the host OS when an access of the guest OS to the guest frame buffer is sensed, or transmit the address of the guest frame buffer to the host OS at regular intervals of a preset time period.

In operation 3020, the processor 3100 may produce a composition screen image by transforming the screen image of the guest OS into a texture and composing the texture with a texture screen image of the host OS. The host OS may transform the screen image of the guest OS into a texture, or the GPU 3200 may transform the screen image of the guest OS into a texture.

For example, when a format of the screen image of the guest OS is different from that of the texture of the host OS, the processor 3100 may transform the format of the screen image of the guest OS into the format of the host OS to thereby produce a transformed texture.

The processor 3100 may display the screen image of the guest OS and the screen image of the host OS on the display 3300 by using a multi-window. Alternatively, the processor 3100 may display the screen image of the guest OS or the screen image of the host OS on the display 3300 by using a sub-window. The processor 3100 may display the screen image of the host OS together with a notification bar.

In operation 3030, the display 3300 displays the composition screen image. The display 3300 is controlled by the processor 3100 and receives from the GPU 3300 a screen image that is to be output.

According to an exemplary embodiment, the electronic apparatus 3000 may display a composition screen by composing respective screen images of different OSs.

According to another exemplary embodiment, the electronic apparatus 3000 may adjust respective FPSs of the OSs.

The apparatuses described herein may comprise a processor, a memory for storing program data and executing it, a permanent storage unit such as a disk drive, a communications port for handling communication with external devices, and user interface devices, including a touch panel, keys, buttons, etc. When software modules or algorithms are involved, these software modules may be stored as program instructions or computer-readable codes executable on a processor on a computer-readable medium. Examples of the computer-readable recording medium include magnetic storage media (e.g., read-only memory (ROM), random-access memory (RAM), floppy disks, hard disks, etc.), and optical recording media (e.g., CD-ROMs, or Digital Versatile Discs (DVDs)). The computer-readable recording medium can also be distributed over network-coupled computer systems so that the computer-readable code is stored and executed in a distributive manner. This media can be read by the computer, stored in the memory, and executed by the processor.

Exemplary embodiments may be described in terms of functional block components and various processing steps. Such functional blocks may be realized by any number of hardware and/or software components configured to perform the specified functions. For example, exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the exemplary embodiments described herein may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the exemplary embodiments described herein could employ any number of techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples and are not intended to otherwise limit the scope of the exemplary embodiments in any way. For the sake of brevity, descriptions of electronics, control systems, software development and other functional aspects of the systems not necessary for understanding the exemplary embodiments may not be provided in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus.

The use of the terms "a", "an", "the" and similar referents in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The exemplary embodiments are not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

The exemplary embodiments should be considered in descriptive sense only and not for purposes of limitation. Descriptions of features or aspects within each exemplary embodiment should typically be considered as available for other similar features or aspects in other exemplary embodiments.

While the exemplary embodiments have been particularly shown and described with reference to the drawings, it will be understood by those of ordinary skill in the art that various changes in form and details may be made therein without departing from the spirit and scope of the inventive concept as defined by the following claims.

What is claimed is:

1. A method of composing and displaying screen images, implemented by at least one processor, the method comprising:
   transmitting a screen image of a guest operating system (OS) to a host OS, in response to the guest OS and the host OS exclusively or jointly accessing a graphics processing unit (GPU) in a mediated pass-through environment via GPU virtualization;
   adjusting a scheduling priority of the GPU for the guest OS and the host OS based on a comparison between a target frames per second (FPS) and a current FPS of the guest OS and the host OS;
   generating a composition screen image by copying the screen image stored in a first storage area of the guest OS to a second storage area of the host OS in response to receiving a storage completion signal for the screen image of the guest OS from the guest OS and transforming the screen image of the guest OS into a texture and composing the texture with a texture screen image of the host OS; and
   displaying the composition screen image,
   wherein the generating the composition screen image comprises, in response to a format of the screen image of the guest OS being different from a format of the texture screen image of the host OS, transforming the format of the screen image of the guest OS into a format of the host OS to generate the texture.

2. The method of claim 1, wherein the transmitting the screen image of the guest OS comprises:
   checking an address of a guest frame buffer in which the screen image of the guest OS is stored; and
   transmitting the address of the guest frame buffer to the host OS.

3. The method of claim 2, wherein:
   the transmitting the screen image of the guest OS comprises directly transmitting the address of the guest frame buffer to the host OS or transmitting the address of the guest frame buffer to the host OS via a hypervisor; and the transmitting is performed by the guest OS.

4. The method of claim 3, wherein:

the transmitting the screen image of the guest OS comprises transmitting the address of the guest frame buffer to the host OS after receiving a signal from the guest OS, or transmitting the address of the guest frame buffer to the host OS in response to detecting that the guest OS has accessed the guest frame buffer, or transmitting the address of the guest frame buffer to the host OS at regular intervals of a preset time period; and the transmitting is performed by the hypervisor.

5. The method of claim 1, wherein the generating the composition screen image comprises transforming the screen image of the guest OS into the texture by the host OS, or transforming the screen image of the guest OS into the texture by the GPU.

6. The method of claim 1, wherein the displaying the composition screen image comprises displaying the screen image of the guest OS and the screen image of the host OS in a plurality of windows.

7. The method of claim 1, wherein the displaying the composition screen image comprises displaying the screen image of the guest OS or the screen image of the host OS in a sub-window.

8. The method of claim 1, wherein the displaying the composition screen image comprises displaying the screen image of the host OS together with a notification bar.

9. An electronic apparatus comprising:

at least one processor configured to control:

a guest OS configured to transmit a screen image of the guest OS to a host OS, in response to the guest OS and the host OS exclusively or jointly accessing a graphics processing unit (GPU) in a mediated- pass-through environment via GPU virtualization, and the host OS configured to generate a composition screen image by copying the screen image stored in a first storage area of the guest OS to a second storage area of the host OS in response to receiving a storage completion signal for the screen image of the guest OS from the guest OS and transforming the screen image of the guest OS into a texture and composing the texture with a texture screen image of the host OS; and a hypervisor configured to adjust a scheduling priority of the GPU for the guest OS and the host OS based on a comparison between a target frames per second (FPS) and a current FPS of the guest OS and the host OS;

a display configured to display the composition screen image, wherein, in response to a format of the screen image of the guest OS being different from a format of the texture screen image of the host OS, the host OS generates the texture by transforming the format of the screen image of the guest OS into a format of the host OS.

10. The electronic apparatus of claim 9, wherein the guest OS checks an address of a guest frame buffer in which the screen image of the guest OS is stored, and transmits the address of the guest frame buffer to the host OS.

11. The electronic apparatus of claim 10, wherein the hypervisor is configured to transmit the address of the guest frame buffer to the host OS.

12. The electronic apparatus of claim 11, wherein the hypervisor transmits the address of the guest frame buffer to the host OS after the hypervisor receives a signal from the guest OS, or transmits the address of the guest frame buffer to the host OS in response to detecting that the guest OS has accessed the guest frame buffer, or transmits the address of the guest frame buffer to the host OS at regular intervals of a preset time period.

13. The electronic apparatus of claim 9, wherein the host OS transforms the screen image of the guest OS into the texture, or the GPU transforms the screen image of the guest OS into the texture.

14. The electronic apparatus of claim 9, wherein the host OS controls the display to display the screen image of the guest OS and the screen image of the host OS in a plurality of windows.

15. The electronic apparatus of claim 9, wherein the host OS controls the display to display the screen image of the guest OS or the screen image of the host OS in a sub-window.

16. The electronic apparatus of claim 9, wherein the host OS controls the display to display the screen image of the host OS together with a notification bar.

17. A non-transitory computer-readable recording medium having recorded thereon a computer program, which, when executed by a computer, performs the method of claim 1.

18. A method of composing and displaying screen images, implemented by at least one processor, the method comprising:

transmitting a screen image of a guest operating system (OS) to a host OS, in response to the guest OS and the host OS jointly accessing a graphics processing unit (GPU);

adjusting a scheduling priority of the GPU for the guest OS and the host OS based on a comparison between a target frames per second (FPS) and a current FPS of the guest OS and the host OS;

generating a composition screen image by copying the screen image stored in a first storage area of the guest OS to a second storage area of the host OS in response to the host OS receiving a storage completion signal for the screen image of the guest OS from the guest OS and transforming the screen image of the guest OS into a texture and composing the texture with a texture screen image of the host OS; and displaying the composition screen image, wherein the generating the composition screen image comprises, in response to a format of the screen image of the guest OS being different from a format of the texture screen image of the host OS, transforming the format of the screen image of the guest OS into a format of the host OS to generate the texture.

* * * * *